United States Patent [19]

Rothschild et al.

[11] Patent Number: 5,822,523
[45] Date of Patent: Oct. 13, 1998

[54] SERVER-GROUP MESSAGING SYSTEM FOR INTERACTIVE APPLICATIONS

[75] Inventors: Jeffrey J. Rothschild; Marc P. Kwiatkowski, both of Los Gatos; Daniel J. Samuel, Sunnyvale, all of Calif.

[73] Assignee: Mpath Interactive, Inc., Mountain View, Calif.

[21] Appl. No.: 595,323

[22] Filed: Feb. 1, 1996

[51] Int. Cl.[6] .................................................. H04H 1/02
[52] U.S. Cl. ............................ 395/200.17; 395/200.1; 395/200.09
[58] Field of Search ........................ 395/200.1, 200.01, 395/200.09, 200.17, 200.05, 793; 370/85.13, 60

[56] References Cited

U.S. PATENT DOCUMENTS

| | | | |
|---|---|---|---|
| 4,470,954 | 9/1984 | Cotton et al. | 370/60 |
| 5,079,767 | 1/1992 | Perlman | 370/94.3 |
| 5,150,464 | 9/1992 | Sidhu et al. | 395/200.01 |
| 5,309,433 | 5/1994 | Cidon et al. | 370/60 |
| 5,309,437 | 5/1994 | Perlman et al. | 370/85.13 |
| 5,329,619 | 7/1994 | Pagé et al. | 395/200.01 |
| 5,361,256 | 11/1994 | Doeringer et al. | 370/60 |
| 5,475,819 | 12/1995 | Miller et al. | 395/200.01 |
| 5,517,494 | 5/1996 | Green | 370/60 |

FOREIGN PATENT DOCUMENTS

| | | |
|---|---|---|
| 0637142 | 1/1995 | European Pat. Off. . |
| WO 95/10908 | 4/1995 | WIPO . |
| WO 95/10911 | 4/1995 | WIPO . |

Primary Examiner—William M. Treat
Assistant Examiner—Zarni Maung
Attorney, Agent, or Firm—H. C. Chan; Wison Sonsini Goodrich & Rosati

[57] ABSTRACT

A method for deploying interactive applications over a network containing host computers and group messaging servers is disclosed. The method operates in a conventional unicast network architecture comprised of conventional network links and unicast gateways and routers. The hosts send messages containing destination group addresses by unicast to the group messaging servers. The group addresses select message groups maintained by the group messaging servers. For each message group, the group messaging servers also maintain a list of all of the hosts that are members of the particular group. In its most simple implementation, the method consists of the group server receiving a message from a host containing a destination group address. Using the group address, the group messaging server then selects a message group which lists all of the host members of the group which are the targets of messages to the group. The group messaging server then forwards the message to each of the target hosts. In an interactive application, many messages will be arriving at the group server close to one another in time. Rather than simply forward each message to its targeted hosts, the group messaging server aggregates the contents of each of messages received during a specified time period and then sends an aggregated message to the targeted hosts. The time period can be defined in a number of ways. This method reduces the message traffic between hosts in a networked interactive application and contributes to reducing the latency in the communications between the hosts.

6 Claims, 11 Drawing Sheets

SERVER-GROUP MESSAGING SYSTEM FOR INTERACTIVE APPLICATIONS

FIELD OF THE INVENTION

The present invention relates to computer network systems, and particularly to server group messaging systems and methods for reducing message rate and latency.

BACKGROUND OF THE INVENTION

There are a wide range of interactive applications implemented on computer systems today. All are characterized by dynamic response to the user. The user provides input to the computer and the application responds quickly. One popular example of interactive applications on personal computers (PCs) are games. In this case, rapid response to the user may mean redrawing the screen with a new picture in between 30 ms and 100 ms. Interactive applications such as games control the speed of their interaction with the user through an internal time base. The application uses this time base to derive rates at which the user input is sampled, the screen is redrawn and sound is played.

As computers have become more powerful and common, it has become important to connect them together in networks. A network is comprised of nodes and links. The nodes are connected in such a way that there exists a path from each node over the links and through the other nodes to each of the other nodes in the network. Each node may be connected to the network with one or more links. Nodes are further categorized into hosts, gateways and routers. Hosts are computer systems that are connected to the network by one link. They communicate with the other nodes on the network by sending messages and receiving messages. Gateways are computer systems connected to the network by more than one link. They not only communicate with the other nodes as do hosts, but they also forward messages on one of their network links to other nodes on their other network links. This processing of forwarding messages is called routing. In addition to sending and receiving messages and their routing functions, gateways may perform other functions in a network. Routers are nodes that are connected to the network by more than one link and whose sole function is the forwarding of messages on one network link to the other network links to which it is connected. A network consisting of many network links can be thought of as a network of sub-networks with gateways and/or routers connecting the sub-networks together into what is called an internet. Today the widely known example of a world wide internet is the so called "Internet" which in 1995 has over 10 million computers connected full time world-wide.

With so many computers on a single world-wide network, it is desirable to create interactive networked applications that bring together many people in a shared, networked, interactive application. Unfortunately, creating such shared networked, interactive applications runs into the limitations of the existing network technology.

As an example, consider a game designed to be deployed over a network which is to be played by multiple players simultaneously. The game could be implemented in software on a PC connected to a network. A rate set by its internal time base, it would sample the inputs of the local user, receive messages from the network from the PCs of the other players and send messages out to the PCs of the other players. A typical rate will be ten time per second for a time period of 100 ms. The messages sent between the PCs would contain information that was needed to keep the game consistent between all of the PCs. In a game that created the illusion of a spatial environment where each player could move, the packets could contain information about the new positions of the players as they moved. Today there are many commercial example of PC games that can be played between multiple players on Local Area Networks (LANs) or by two players over dial-up phone lines using modems. The network messages sent by such games contain a wide variety of information specific to the game. This can include position and velocity information of the objects in the game along with special actions taken by a player that effect the other players in the game.

The case of a two player game played over a modem is particularly simple. If the message rate is 10 messages per second, each PC sends 10 messages per second to the other PC and receives 10 messages per second. The delay introduced by the modems and phone line is small and will not be noticed in most games. Unfortunately, the case of two players is uninteresting for networked interactive applications. With the same game played with 8 players on a LAN, the message rate increases. Each PC must send 7 messages, one to each of the other 7 players every time period and will receive 7 messages from the other players in the same time period. If the messaging time period is 100 ms, the total message rate will be 70 messages sent per second and 70 messages received per second. As can be seen the message rate increases linearly with the number of players in the game. The message rates and data rates supported by popular LANs are high enough to support a large number of players at reasonable message sizes. Unfortunately, LANs are only deployed in commercial applications and cannot be considered for deploying a networked interactive application to consumer users.

The wide area networks available today to consumer users all must be accessed through dial-up phone lines using modems. While modem speeds have increased rapidly, they have now reached a bit rate of 28.8 Kbits/sec which is close to the limit set by the signal-to-noise ratio of conventional phone lines. Further speed increases are possible with ISDN, but this technology is not ready for mass market use. Other new wide area networking technologies are being discussed that would provide much higher bandwidth, but none are close to commercial operation. Therefore, in deploying a networked, interactive application to consumers, it is necessary to do so in a way that operates with existing networking and communications infrastructures.

In the example of the 8 player networked game, consider a wide area network implementation where the PCs of each of the players is connected to the network with a 28.8 Kbit/sec modem. Assume that the network used in this example is the Internet so that all of the network protocols and routing behavior is well defined and understood. If the game uses TCP/IP to send its messages between the PCs in the game, the PPP protocol over the dial-up phone lines can be advantageously used to compress the TCP/IP headers. Even so, a typical message will be approximately 25 bytes in size. Sent through the modem, this is 250 bits. The messages are sent 10 times per second to each of the other PCs in the game and received 10 times per second from the other PCs. This is 35.0 Kbits/sec which exceeds the capabilities of the modem by 20%. If the messages are reduced to 20 bytes, just 8 players can be supported, but this approach clearly cannot support networked interactive applications with large numbers of participants. There are other problems beyond just the bandwidth of the network connection. There is the loading on each PC caused by the high packet rates and there is the latency introduced by the time needed to send all of the outbound packets. Each packet sent or received by a PC will require some amount of processing time. As the packet rate increases with the number of players in the game, less and less of the processor will be available for running the game software itself Latency is important in an interactive application because it defines the responsiveness of the system. When a player provides a new input on their system, it is desirable for that input to immediately affect the game on all of the other players systems. This is particularly important in any game where the game outcome depends on players shooting at targets that are moved by the actions of the other players. Latency in this case will be the time from when a player acts to move a target to the time that the target has moved on the screens of the other players in the game. A major portion of this latency will come from the time needed to send the messages to the other seven players in the game. In this example the time to send the messages to the other 7 players will be approximately 50 ms. While the first player of the seven will receive the message quickly, it will not be until 50 ms have passed that the last player of the seven will have received the message.

Internet Protocol Multicasting

As mentioned before, the Internet is a widely known example of a wide area network. The Internet is based on a protocol appropriately called the Internet Protocol (IP). In the OSI reference model for layers of network protocols, IP corresponds to a layer 3 or Network layer protocol. It provides services for transmission and routing of packets between two nodes in an internet. The addressing model provides a 32 bit address for all nodes in the network and all packets carry source and destination addresses. IP also defines the routing of packets between network links in an inter-network. Gateways and routers maintain tables that are used to lookup routing information based on the destination addresses of the packets they receive. The routing information tells the gateway/router whether the destination of the packet is directly reachable on a local network link connected to the gateway/router or if not, the address of another gateway/router on one of the local network links to which the packet should be forwarded. On top of IP are the layer 4 transport protocols TCP and UDP. UDP provides datagram delivery services to applications that does not guarantee reliable or in-order delivery of the datagrams. TCP is a connection oriented service to applications that does provide reliable delivery of a data stream. It handles division of the stream into packets and ensures reliable, in-order delivery. See the Internet Society RFCs: RFC-791 "Internet Protocol", RFC-793 "Transmission Control Protocol" and RFC-1180 "A TCP/IP Tutorial". IP, TCP and UDP are unicast protocols: packets, streams or datagrams are transmitted from a source to a single destination.

As an example, consider FIGS. 1 and 2. FIG. 1 shows a conventional unicast network with hosts 1, 2, 3 and 4 and network links 11, 12, 13, 14, 15,16,17, 18 and 19 and routers 5, 6, 7, 8, 9 and 10. In this example, each host wants to send a data payload to each of the other hosts. Host 1 has network address A, host 2 has network address C, host 3 has network address B and host 4 has network address D. Existing network protocols are typically based on packet formats that contain a source address, destination address and a payload. This is representative of commonly used wide area network protocols such as IP. There are other components in an actual IP packet, but for sake of this example, only these items will be considered. FIG. 2 shows the example packets that are sent by the hosts to one another using a conventional unicast network protocol such as IP. Host 1 send packets 20, to host 3, packet 21 to host 2 and packet 22 to host 4. Host 1 wants to send the same data P1 to each of the other three hosts, therefore the payload in all three packets is the same. Packet 20 travels over network links 11, 12, 15 and 18 and through routers 5, 6, and 8 to reach host 3. In a similar fashion host 3 sends packets 23 to host 1, packet 24 to host 2 and packet 25 to host 4. Host 2 and host 4 send packets 26, 27, 28 and 29, 30, 31 respectively to the other three hosts. All of these packets are carried by the unicast network individually from the source host to the destination host. So in this example each host must send three packets and receive three packets in order for each host to send its payload to the other three hosts.

As can be seen, each host must send a packet to every other host that it wishes to communicate with in an interactive application. Further, it receives a packet from every other host that wishes to communicate with it. In an interactive application, this will happen at a regular and high rate. All of the hosts that wish to communicate with one another will need to send packets to each other eight to ten times per second. With four hosts communicating with one another as in this example, each host will send three messages and receive three messages eight to ten times per second. As the number of hosts in the application that need to communicate with one another grows, the message rate will reach a rate that cannot be supported by conventional dial-up lines. This makes unicast transport protocols unsuitable for delivering interactive applications for multiple participants since their use will result in the problem of high packet rates that grow with the number of participants.

Work has been done to attempt to extend the IP protocol to support multicasting. See RFC-1112 "Host Extensions for IP Multicasting". This document describes a set of extensions to the IP protocol that enable IP multicasting. IP multicasting supports the transmission of a IP datagram to a host group by addressing the datagram to a single destination address. Multicast addresses are a subset of the IP address space and identified by class DIP addresses—these are IP addresses with "1110" in the high order 4 bits. The host group contains zero or more IP hosts and the IP multicasting protocol transmits a multicast datagram to all members of the group to which it is addressed. Hosts may join and leave groups dynamically and the routing of multicast datagrams is supported by multicast routers and gateways. It is proper to describe this general approach to multicast messaging as "distributed multicast messaging". It is a distributed technique because the job of message delivery and duplication is distributed throughout the network to all of the multicast routers. For distributed multicast messaging to work in a wide area network, all of the routers handling datagrams for multicast hosts must support the routing of multicast datagrams. Such multicast routers must be aware of the multicast group membership of all of the hosts locally connected to the router in order to deliver multicast datagrams to local hosts. Multicast routers must also be able to forward multicast packets to routers on their local network links. Multicast routers must also decide to which if any local routers they must forward multicast datagrams. When a multicast datagram is received, by a multicast router, its group address is compared to a list for each local multicast router of group addresses. When there is a match, the datagram is then forwarded to that local multicast router. Therefore, the multicast routers in the network must maintain an accurate and up to date list of group addresses for which they are to forward datagrams to. These lists are updated when hosts join or leave multicast groups. Hosts do this by sending messages using Internet Group Management Protocol (IGMP) to their immediately-neighboring multicast routers. A further attribute of distributed multicast messaging is that the routers must propagate the group membership information for a particular group throughout the network to all of the other routers that will be forwarding traffic for that group. RFC-1112 does not describe how this is to be done. Many different approaches have been defined for solving this problem that will be mentioned later in descriptions of related prior art. Despite their differences, all of these approaches are methods for propagation of multicast routing information between the multicast routers and techniques for routing the multicast datagrams in an inter-network supporting distributed multicast messaging.

The distributed multicast messaging approach has a number of undesirable side effects. The process of propagation of group membership information to all of the relevant routers is not instantaneous. In a large complex network it can even take quite a period of time depending on the number of routers that must receive that updated group membership information and how many routers the information for the group membership update must past through. This process can easily take many seconds and even minutes depending on the specifics of the algorithm that is used. RFC-1112 mentions this problem and some of the side effects that must be handled by an implementation of a practical routing algorithm for multicast messaging. One problem results when groups are dynamically created and destroyed. Since there is no central authority in the network for assigning group addresses, it is easily possible in a distributed network for there to be duplication of group address assignment. This will result in incorrect datagram delivery, where hosts will receive unwanted datagrams from the duplicate group. This requires a method at each host to filter out the unwanted datagrams. Another set of problems result from the time delay from when a group is created, destroyed or its membership changed to when all of the routers needed to route the datagrams to the member hosts have been informed of these changes. Imagine the case where Host N joins an existing group by sending a join message to its local router. The group already contains Host M which is a number of router hops away from Host N in the network. Shortly after Host N has sent it join message, Host M sends a datagram to the group, but the local router of Host M has not yet been informed of the change in group membership and as a result the datagram is not forwarded to one of the particular network links connected to the local router of Host M that is the only path in the network from that router that ultimately will reach Host N. The result is that Host N will receive no datagrams addressed to the group from Host M until the local router of M has its group membership information updated. Other related problems can also occur. When a host leaves a group, messages addressed to the group will continue for some time to be routed to that host up to the local router of that host. The local router will know at least not to route the datagram onto the local network of that host. This can still result in a great deal of unnecessary datagrams being carried in a large network when there are many active message groups with rapidly changing memberships.

Finally, distributed multicast messaging does not sufficiently reduce the message rate between the hosts. With distributed multicast messaging, each host need only send one message addressed to the message group in order to send a message to all of other hosts in the group. This is an improvement over conventional unicast messaging where one message would need to be sent to each of the other hosts in a group. However, distributed multicast messaging does nothing to reduce the received message rate at each of the hosts when multiple hosts in a group are sending messages to the group closely spaced in time. Let us return to the example of a group of ten hosts sending messages seven times per-second to the group. With conventional unicast messaging, each host will need to send 9 messages to the other hosts, seven times per-second and will receive 9 messages, seven times per-second. With distributed multicast messaging, each host will need to send only one message to the group containing all of the hosts seven times per-second, but will still receive 9 messages, seven times per-second. It is desirable to further reduce the number of received messages.

An example of distributed multicasting is shown in FIGS. 3 and 4. FIG. 3 shows a network with multicast routers 39, 40, 41, 42, 43 and 44 and hosts 35, 36, 37, 38 and network links 45, 46, 47, 48, 49, 50, 51, 52 and 53. The four hosts have unicast network addresses A, B, C, D and are also all members of a message group with address E. In advance the message group was created and each of the hosts joined the message group so that each of the multicast routers is aware of the message group and has the proper routing information. A network protocol such IP with multicast extensions is assumed to be used in this example. Host 35 sends packet 54 with source address A and destination multicast address E to the entire message group. In the same manner host 37 sends packet 55 to the group, host 36 sends packet 56 to the group and host 38 sends packet 57 to the group. As the packets are handled by the multicast routers they are replicated as necessary in order to deliver them to all the members of the group. Let us consider how a packets sent by host 35 is ultimately delivered to the other hosts. Packet 54 is carried over network link 45 to multicast router 39. The router determines from its routing tables that the multicast packet should be sent onto network links 46 and 47 and duplicates the packet and sends to both of these network links. The packet is received by multicast routers 40 and 43. Multicast router 43 sends the packet onto network link 50 and router 40 sends its onto links 48 and 49. The packet is then received at multicast routers 44, 42 and 41. Router 41 sends the packet over network link 51 where it is received by host 36. Router 42 sends the packet over network link 52 to host 37 and router 44 sends the packet over link 53 to host 38. A similar process is followed for each of the other packets sent by the hosts to the multicast group E. The final packets received by each host are shown in FIG. 4.

While distributed multicasting does reduce the number of messages that need to be sent by the hosts in a networked interactive application, it has no effect on the number of messages that they receive. It has the further disadvantages of poor behavior when group membership is rapidly changing and requires a special network infrastructure of multicast routers. It also has no support for message aggregation and cannot do so since message delivery is distributed. Distributed multicasting also has no support for messages that define logical operations between message groups and unicast host addresses.

All of these problems can be understood when placed in context of the design goals for distributed multicast messaging. Distributed multicast messaging was not designed for interactive applications where groups are rapidly created, changed and destroyed. Instead it was optimized for applications where the groups are created, changed and destroyed over relatively long time spans perhaps measured in many minutes or even hours. An example would be a video conference where all the participants agreed to connect the conference at a particular time for a conference that might last for an hour. Another would be the transmission of an audio or video program from one host to many receiving hosts, perhaps measured in the thousands or even millions. The multicast group would exist for the duration of the audio/video program. Host members would join and leave dynamically, but in this application it would be acceptable for there to be a significant time lag from joining or leaving before the connection was established or broken.

While IP and multicast extensions to IP are based on the routing of packets, another form of wide area networking technology called Asynchronous Transfer Mode (ATM) is based on switching fixed sized cells through switches. Unlike IP which supports both datagram and connection oriented services, ATM is fundamentally connection oriented. An ATM network consists of ATM switches interconnected by point-to-point links. The host systems are connected to the leaves of the network. Before any communication can occur between the hosts through the network, a virtual circuit must be setup across the network. Two forms of communication can be supported by an ATM network. Bi-directional point-to-point between two hosts and point-to-multipoint in one direction from one host to multiple hosts. ATM, however, does not directly support any form of multicasting. There are a number of proposals for layering multicasting on top of ATM. One approach is called a multicast server, shown in FIG. 8. Host systems 112, 113, 114, 115 setup point-to-point connections 106, 107, 108 and 109 to a multicast server 105. ATM cells are sent by the hosts to the multicast server via these links. The multicast server sets up a point-to-multipoint connection 111 to the hosts which collectively constitute a message group. Cells sent to the server which are addressed to the group are forwarded to the point-to-multipoint link 111. The ATM network 110 is responsible for the transport and switching for maintaining all of the connections between the hosts and the server. The cells carried by the point-to-multipoint connection are duplicated when necessary by the ATM switches at the branching points in the network tree between and forwarded down the branching network links. Therefore, the network is responsible for the replication of the cells and their payloads, not the server. This method has the same problems as distributed multicasting when used for an interactive application. Each host still receives individual cells from each of the other hosts, so there is no aggregation of the payloads of the cells targeted at a single host. There is no support for addressing cells to hosts based on logical operations on the sets of members of host groups.

Related Prior Art

There are a number of existing patents and European patent applications that are related to the area of the invention. These can be organized into two separate categories: multicast routing/distribution and source to destination multicast streams.

Multicast routing and distribution

These patents are U.S. Pat. No. 4,740,954 by Cotton et al, U.S. Pat. No. 4,864,559 by Perlman, U.S. Pat. No. 5,361,256 by Doeringer et al, U.S. Pat. No. 5,079,767 by Perlman and U.S. Pat. No. 5,309,433 by Cidon et al. Collectively these patents cover various algorithms for the routing and distribution of the datagrams in distributed multicast networks. None deal with the problems described previously for this class of multicast routing and message distribution such as poor behaviors when the message groups change rapidly. In all of these patents, messages are transmitted from a host via a distributed network of routers to a plurality of destination hosts which are members of a group. Since these patents deal only with variants of distributed multicasting they provide no means to reduce the received message rate, no method to aggregate messages and provide no method in the messages to perform logical operation on message groups.

Source to destination multicast streams

These are PCTs and a European patent application. They are EP 0 637 149 A2 by Perlman et al, PCT/US94/11282 by Danneels et al and PCT/US94/11278 by Sivakumar et al. These three patent applications deal with the transmission of data streams from a source to a group of destinations. In none of these patent applications, is a method described for transmitting data between multiple members of a group. In all of these applications, the data transmission is from a source to a plurality of designations. Since these patent applications deal only with point-to-multipoint messaging, they can provide no means to reduce the received message rate, no method to aggregate messages and provide no method in the messages to perform logical operation on message groups.

SUMMARY OF THE INVENTION

The present invention relates to facilitating efficient communications between multiple host computers over a conventional wide area communications network to implement an interactive application such as a computer game between multiple players. In such an application, the hosts will be dynamically sending to each other information that the other hosts need in order to keep the interactive application operating consistently on each of the hosts. The invention is comprised of a group messaging server connected to the network that maintains a set of message groups used by the hosts to communicate information between themselves. The invention further comprises a server-group messaging protocol used by the hosts and the server. The server-group messaging protocol is layered on top of the Transport Level Protocol (TLP) of the network and is called the Upper Level Protocol (or ULP). In the OSI reference model the ULP can be thought of as a session layer protocol built on top of a transport or applications layer protocol. The ULP protocol uses a server-group address space that is separate from the address space of the TLP. Hosts send messages to addresses in the ULP address space to a group messaging server using the underlying unicast transport protocol of the network. The ULP address space is segmented into unicast addresses, implicit group messaging addresses and logical group messaging addresses. The implicit and logical group messaging addresses are collectively called group messaging addresses.

Host systems must first establish connections to a group messaging server before sending messages to any ULP addresses. The process of establishing this connection is done by sending TLP messages to the server. The server establishes the connection by assigning a unicast ULP address to the host and returning this address in an acknowledgment message to the host. Once connected, hosts can inquire about existing message groups, join existing message groups, create new message groups, leave message groups they have joined and send messages to ULP addresses known by the server. Each message group is assigned either an implicit or logical ULP address depending on its type.

FIG. 5 shows an example of a wide area network with a group messaging server ("GMS"). Hosts 58 has TLP address A and ULP address H, host 59 has TLP address C and ULP address J, host 60 has TLP address B and ULP address I and host 61 has TLP address D and ULP address K. The network is a conventional unicast network of network links 69, 70, 71, 72, 73, 74, 75, 76, and 77 and unicast routers 63, 64, 65, 66, 67, and 68. The group messaging server 62 receives messages from the hosts addressed to a message group and send the contents of the messages to the members of the message group. FIG. 6 shows an example of datagrams sent from the hosts to a message group that they are members of As before, a TLP such as IP (where the message header contain the source and destination TLP addresses) is assumed to be used here. Host 58 sends message 80 which contains the TLP source address A of the host and the destination TLP address S for the GMS 62. The destination ULP address G is an implicit ULP address handled by the GMS and the payload P1 contains both the data to be sent and the source ULP address H of the host. It is assumed that prior to sending their ULP messages to the GMS, that each host as already established a connection to the GMS and joined the message group G. Host 60 sends message 81 with payload P2 containing data and source ULP address I. Hosts 59 sends message 82 with payload P3 containing data and source ULP address J. Host 61 sends message 83 with payload P4 containing data and source ULP address K. The GMS receives all of these messages and sees that each message is addressed to implicit message group G with members H, I, J, and K. The GMS can either process the message with or without aggregating their payloads. FIG. 6 shows the case where there is no aggregation and FIG. 7 shows the case with aggregation.

Without aggregation, the GMS generates the outbound messages 84, 85, 86, 87, 88, 89, 90, 91, 92, 93, 94, and 95 which it sends to the hosts. The datagrams have TLP headers with the source and destination TLP addresses of the GMS and the hosts respectively. The next field in the datagrams is the destination ULP of the datagram. Datagrams 84, 85, and sent to host 58 with TLP address A and ULP address H. Datagrams 87, 88, and 89 are sent to host 60 with TLP address B and ULP address I. Datagrams 90, 91 and 92 are sent to host 59 with TLP address C and ULP address J. Datagrams 93, 94 and 95 are sent to host 61 with TLP address D and ULP address K respectively. As can be seen from the payloads that each host has received, each host has received the payloads from the other three hosts. Note that each host has not received a copy of its own original message. This is because the GMS has performed echo suppression. This is selectable attribute of the GMS since in some applications it is useful for the hosts to receive and echo of each message that they send to a group that they are also members of In the example of FIG. 6, it has been shown how the present invention can achieve the same message delivery as distributed multicasting without its disadvantages. Without aggregation, the present invention enables a host to send a single message to multiple other hosts that are members of a message group. It reduces the message traffic that a host must process in an interactive application by reducing the number of messages that each host must send to the others. Without aggregation, however, there is no reduction in the number of messages received by the hosts. Without aggregation we can achieve the same message rate as distributed multicasting without the need for a network with multicast routers, we can use a conventional unicast network such as the Internet. The present invention also avoids the problems that dynamic group membership causes for distributed multicasting. Group membership can be changed very rapidly. Groups can be created, joined and left by single unicast messages from hosts to the GMS. These messages will be point-to-point messages and will not have to propagate in throughout the network nor have to cause routing table changes in the routers. This ability to rapidly and accurately change group membership is critical to the implementation of networked interactive applications. Consider a computer game for multiple players that supports hundreds of players that are spread throughout a three dimensional space created by the game. At any time only a few players will be able to see and effect one another in the game since other players will be in other areas that are out of sight. Using conventional phone lines to carry the data from each players computer to the network, it will not be possible to send all actions of each player to all of the other players, but because only a few players will be in close proximity at any one time, it will not be necessary to do so. It is only necessary to send data between the players that are in close proximity to one another. These "groups" of players naturally map onto the message groups of the invention. As players move about the three dimensional space of the game, game will cause them to join and leave message groups as necessary. If this does not happen rapidly it will limit the interactivity of the game or cause inconsistent results for the different players in the game.

The invention also allows aggregating message payloads of multiple messages destined to a single host into a single larger message. This can be done because of the GMS where all of the messages are received prior to being sent to the hosts. FIG. 7 shows an example of how this works. The hosts send their messages to the GMS in exactly the same fashion as in FIG. 6 using the same addresses previously defined in FIG. 5. Host 58 sends message 96, host 60 sends message 97, host 59 sends message 98 and host 61 sends message 99. The GMS receives all of these messages and creates four outbound messages 100, 101, 102 and 103. The process by which these messages will be explained in detail in the detailed description of the invention. Each message is destined to a single host and contains an aggregated payload with multiple payload items. Message 100 has a destination ULP address H for host 58 and aggregated payload P2, P3 and P4 from the messages from hosts 59, 60 and 61. Message 101 is targeted at host 60, message 102 is targeted at host 59 and message 103 is targeted at host 61, As can be seen, each host sends one message and receives one message. The received message is longer and contains multiple payloads, but this is a significant improvement over receiving multiple messages with the wasted overhead of multiple message headers and message processing time. Overall the invention has dramatically reduced the amount of data that must be sent and received by each host. Since the bit rate over conventional phone lines using a modem is low, a reduction in the amount of data that must be sent and received directly translates into improved time and latency for message communications between the hosts.

Hosts create, join and leave message groups using control messages in the ULP protocol to the GMS. Hosts may also read and write application specific state information that is stored in the GMS. When hosts send messages to other hosts, the message must be at least addressed to an implicit group address. The ULP implicit address will always be the primary address in a message from one host to another. The message may optionally specify auxiliary destination addresses. In many cases the implicit ULP address will be the only destination ULP address in the message. The GMS will handle delivery of the ULP messages addressed to the implicit message group to all of the hosts that are members of the group. A ULP send message may optionally specify an address list of auxiliary addresses in addition to the primary destination of the implicit ULP address. This auxiliary address list can contain only unicast and logical ULP addresses. The address list can also specify set operators to be performed between the sets of host ULP addresses defined by the unicast addresses and logical groups. Once the address list has been processed to yield a set of hosts, this set is intersected with the set of hosts that are members of the implicit message group specified by the primary implicit ULP address in the message. This ability to perform logical set operators on message groups is very useful in interactive applications. It allows a single ULP message to selectively deliver a message to hosts that fit a set of computed criteria without the sending host having to know the anything about the members of the groups in the address list. Recall the example of a networked game with hundreds of players in a three dimensional environment created by the game. Consider an implicit message group consisting of all of the game players in a certain area of the game where all of the players can interact with one another. Consider that the players are organized into multiple teams. Logical message groups could be created for each team within the game. To send a message to all the players within the area that were on one team, a ULP message would be sent to the ULP implicit message group for all the players in the area with an auxiliary address of the logical message group for all the players on the selected team. The GMS would perform the proper set intersection prior to sending the resulting messages to the targeted hosts. The result of this will be that the message will only be delivered to the players on the selected team in the selected area of the game.

In summary, the present invention deals with the issues of deploying an interactive application for multiple participants on wide area networks by providing a method for reducing the overall message rate and reducing latency. This invention uses a server group messaging approach, as oppose to the above described "distributed multicast messaging" approach. The present invention overcomes the undesirable side effects of the distributed multicast messaging approach. Further, it reduces the message rate between the hosts. As pointed out in an example discussed above, with prior art distributed multicast messaging, each host will need to send only one message to the group containing all of the hosts seven times per-second, but will still receive 9 messages, seven times per-second. The present invention of server group messaging has each host sending one message, seven times per-second and receiving one message, seven times per-second.

The present invention is different from the multicast routing and distribution method disclosed in U.S. Pat. Nos. 4,740,954, 4,864,559, 5,361,256, 5,079,767 and 5,309,433. Since these patents deal only with variants of distributed multicasting they provide no means to reduce the received message rate, no method to aggregate messages and provide no method in the messages to perform logical operation on message groups. This differs from the present invention where messages from multiple hosts addressed to a message group are received by a group server which processes the contents of the messages and transmits the results to the destination hosts.

The present invention is also different from the source to destination multicast streams approach disclosed in EP 0 637 149 A2, PCT/US94/11282 and PCT/US94/11278. In all of these references, the data transmission is from a source to a plurality of designations, whereas the present invention describes data transmission from a sending host to a server host system and then from the server host to the destination hosts.

These and other features and advantages of the present invention can be understood from the following detailed description of the invention together with the accompanying drawings.

DETAILED DESCRIPTION OF THE INVENTION

Figure 11:
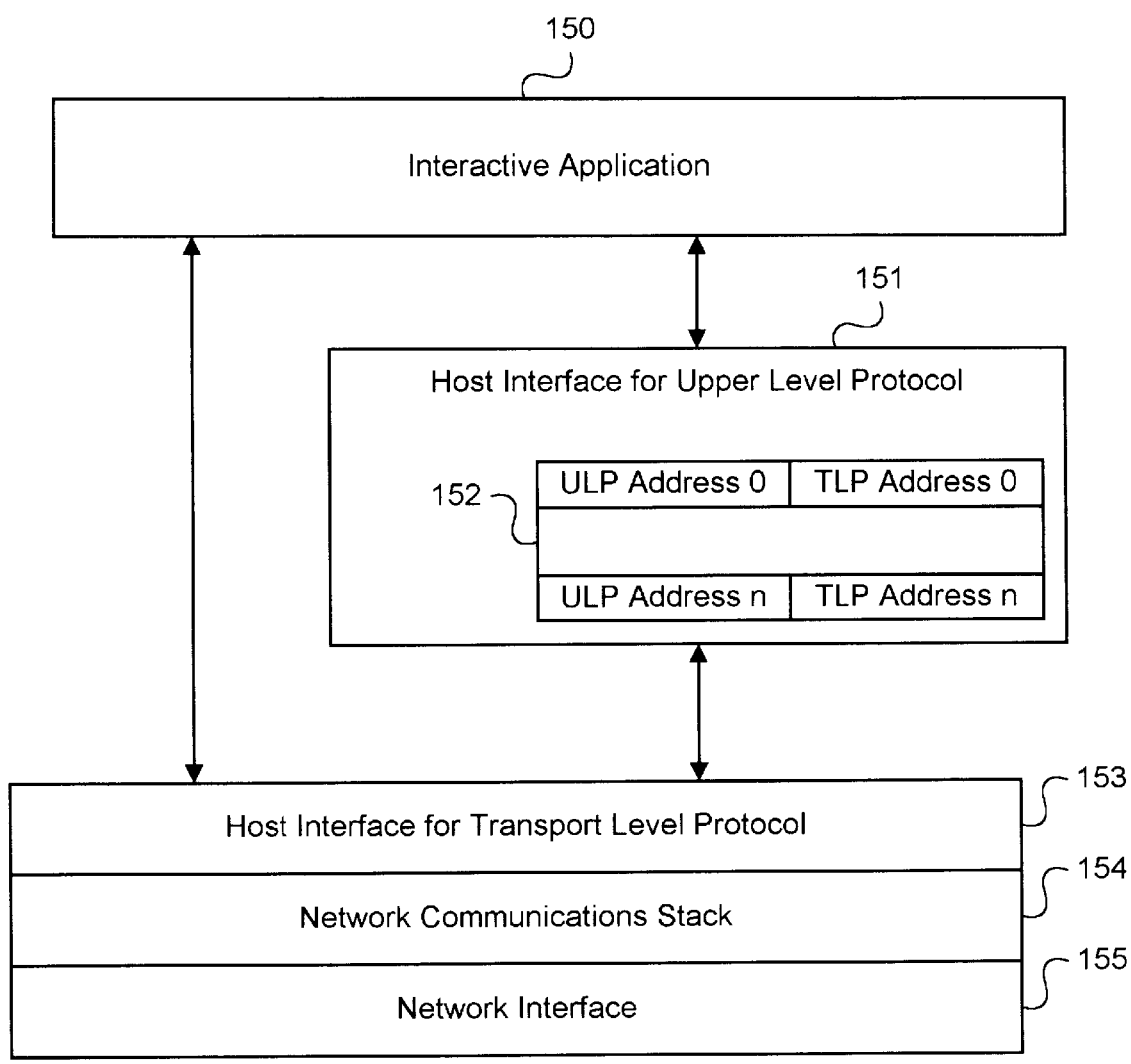
FIG. 11 shows the host software interface and functions needed to support the ULP according to the present invention.

The present invention provides a method for multiple host computers to efficiently communicate information to one another over a wide area network for the purposes of implementing an interactive application between multiple users. The method consists of three components: a host protocol interface, a protocol and a server. The protocol is between the host protocol interface and the server and is implemented on top of the network transport protocol of a wide area network. The protocol is called the Upper Level Protocol (ULP) since it is layered above the existing network Transport Level Protocol (TLP). In the OSI reference model the protocol can be described as a Session Layer protocol on top of the Transport Layer of the network. FIG. 11 shows the host protocol interface, 151, relative to the interactive application, 150, and the host interface for the Transport Level Protocol, 153. The network interface, 155, provides the physical connection for the host to the network. The network communications stack, 154, is the communications protocol stack that provides network transport services for the host and the host interface for the Transport Level Protocol, 153, is and interface between host application software and the network transport services of the network communications stack.

The interactive application can send and receive conventional network messages using the host interface to the TLP. The interactive application also can send and receive ULP messages through the host interface for the ULP. Internal to the host interface for the ULP is a table, 152, of all ULP addresses which the host can send messages to. Each entry in the table contains a pair of addresses, a ULP address and its corresponding TLP address. When the host sends a message to a ULP address, that message is encapsulated in a TLP message sent to the TLP address corresponding to that ULP address. This allows the ULP messages to be handled transparently by the transport mechanisms of the existing network. A core function of the ULP is group messaging where hosts send messages to message groups populated by multiple hosts. This allows a host to send a message to multiple hosts with one ULP message. Since the ULP is layered on top of the TLP, the group messaging functions of the ULP operate on a conventional unicast network where TLP messages can only be sent from one host to only one other host.

The group based messaging is implemented through the use of a server called a group messaging server. All ULP messages from the hosts are sent from the hosts to a group messaging server using the TLP protocol. The server processes the ULP portion of the messages and takes the necessary required by the ULP message. Control ULP messages are processed locally by the server and may be acknowledged to the sending host. ULP messages addressed to other hosts are processed by the group messaging server and then re-transmitted to the proper ULP destination hosts, again using the TLP protocol to encapsulate and transport these messages.

Figure 1:
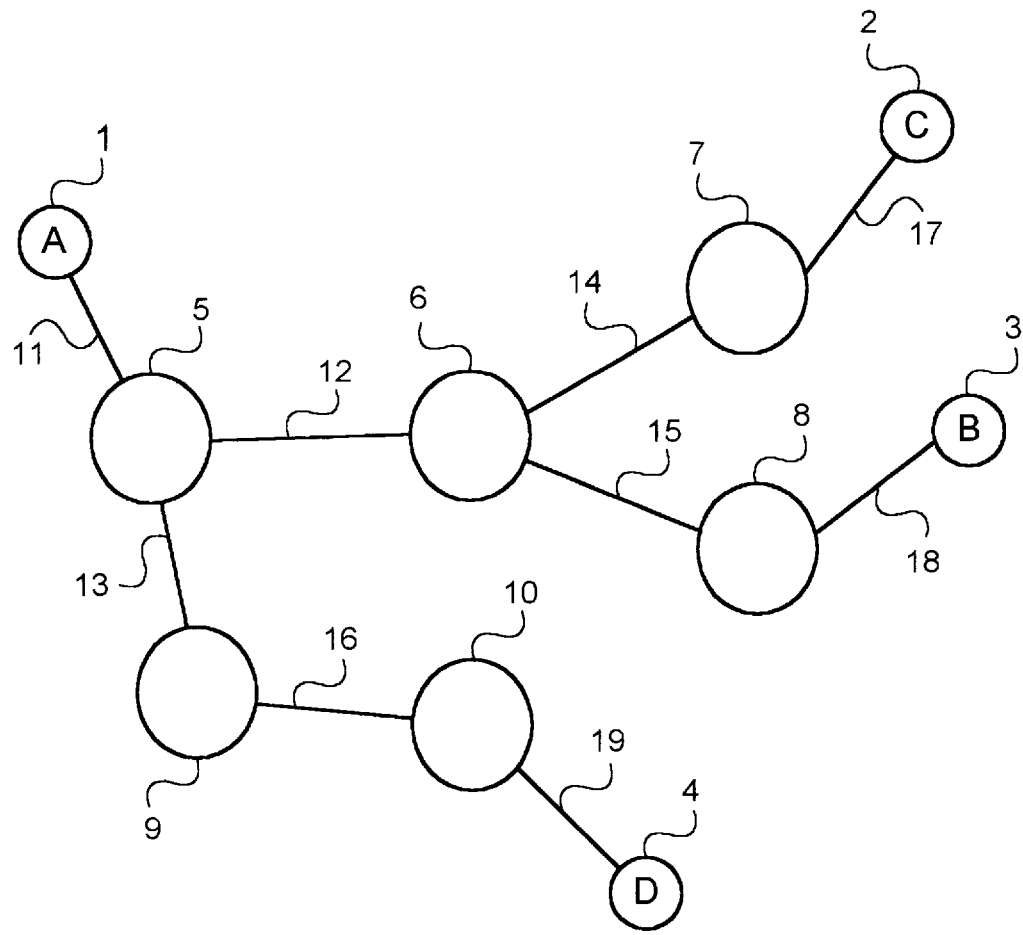
FIG. 1 shows a conventional unicast network consisting of hosts, network links and routers.
Figure 2:
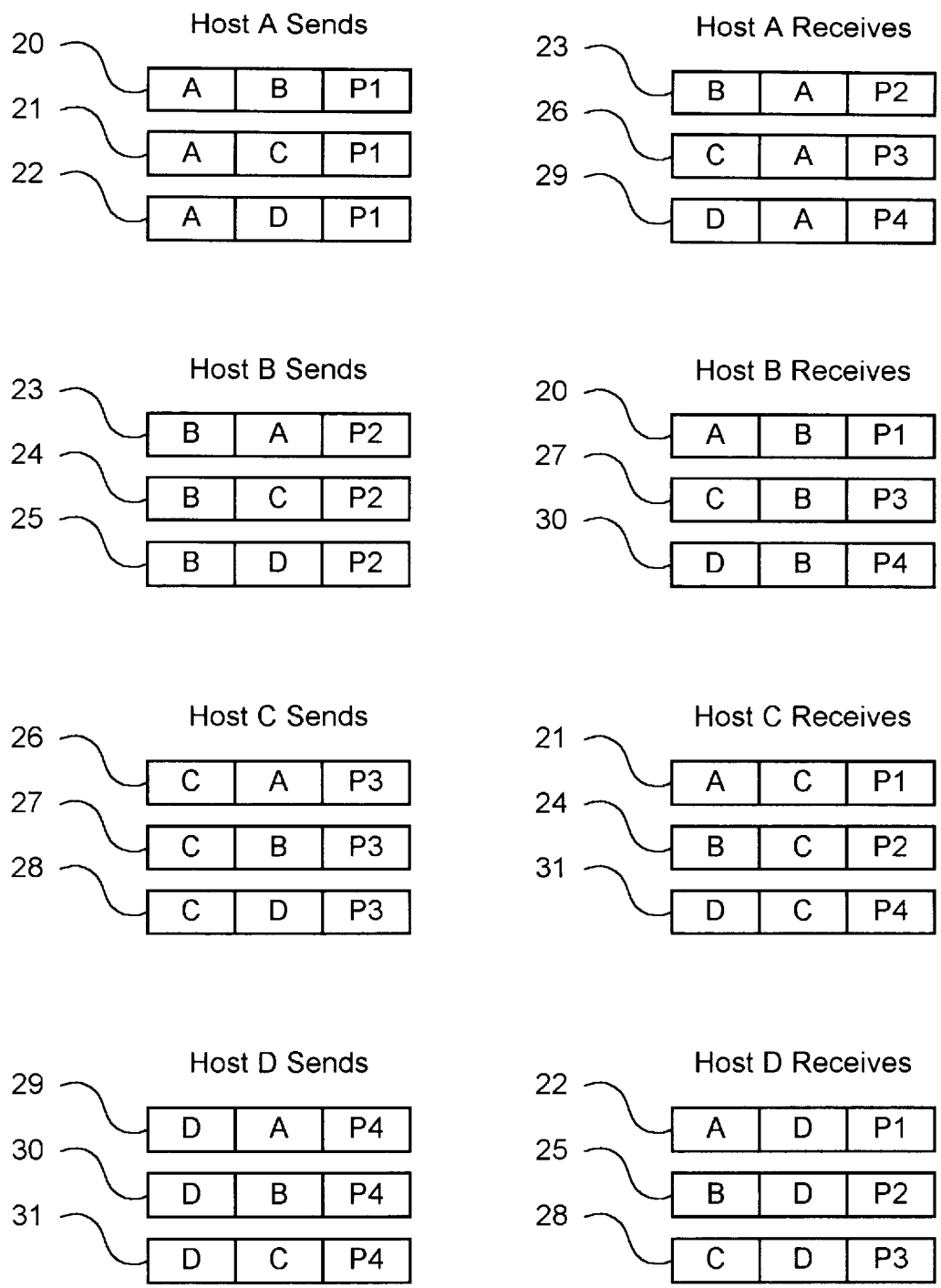
FIG. 2 shows the unicast datagrams on a conventional unicast network that would be needed to implement an interactive application between four hosts.
Figure 3:
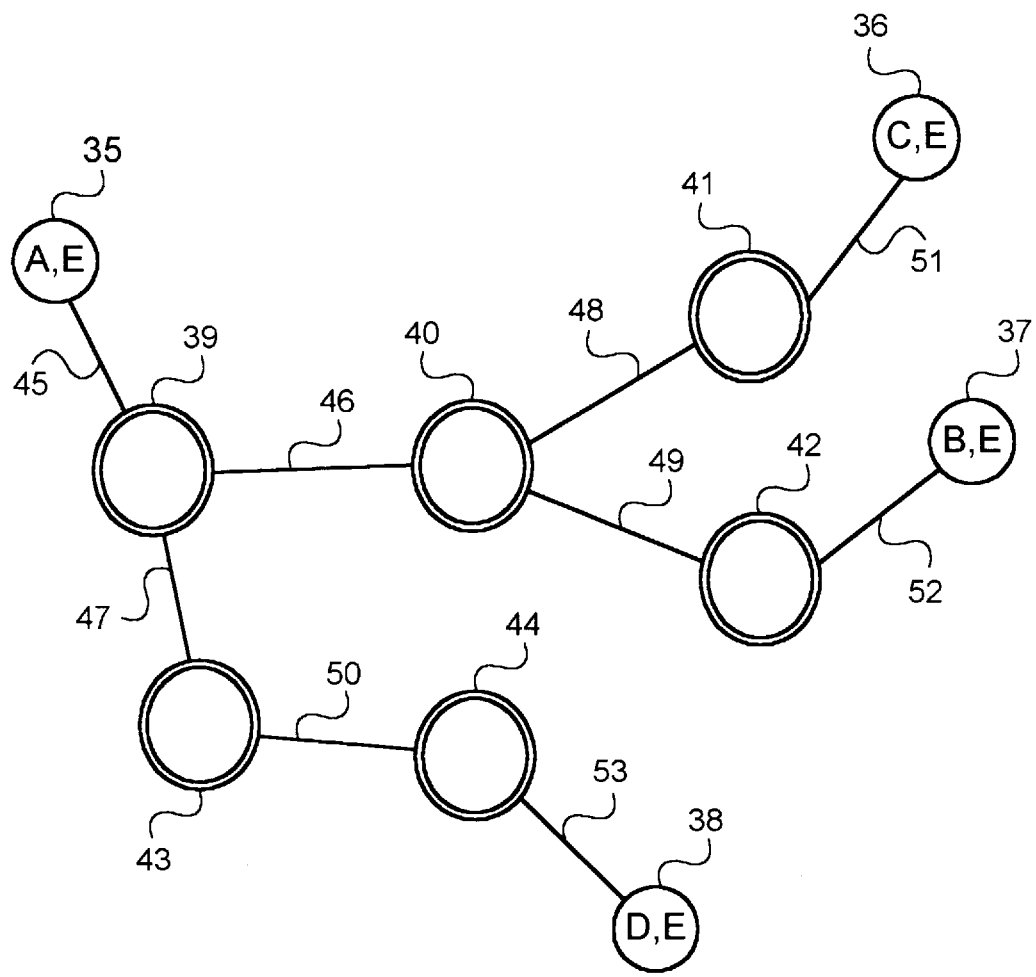
FIG. 3 shows a prior art multicast network consisting of hosts, network links and multicast routers.
Figure 4:
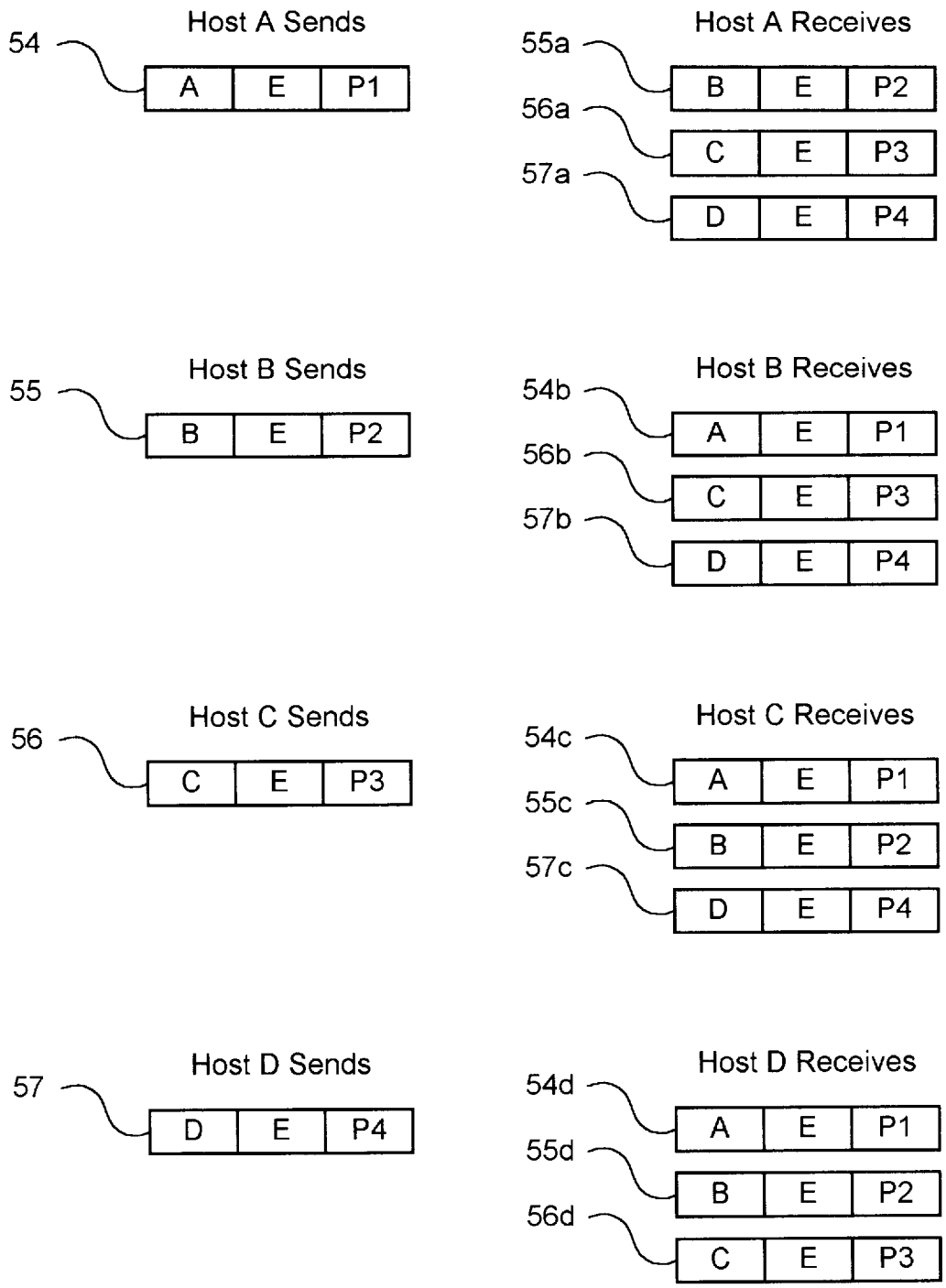
FIG. 4 shows a multicast datagrams on a prior art multicast network that would be needed to implement an interactive application between four hosts.
Figure 5:
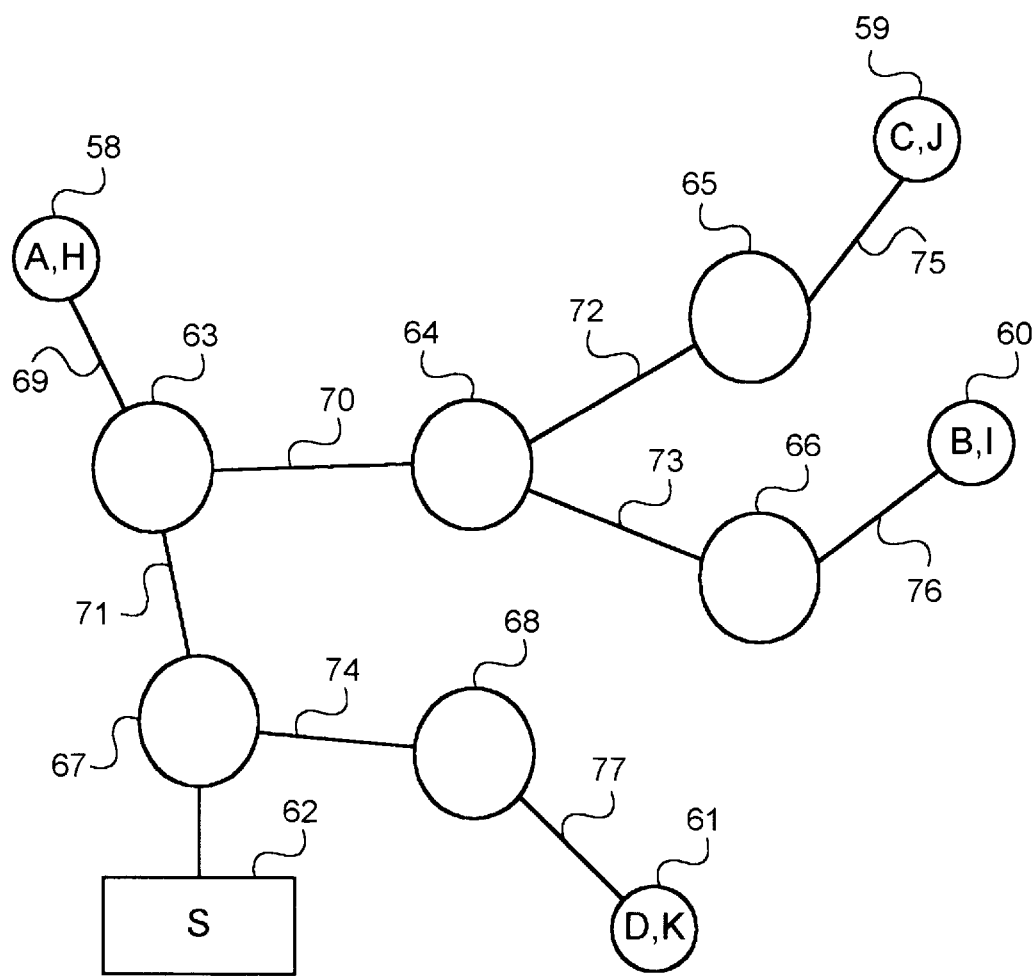
FIG. 5 shows a unicast network equipped with a group messaging server in accordance with the present invention.
Figure 6:
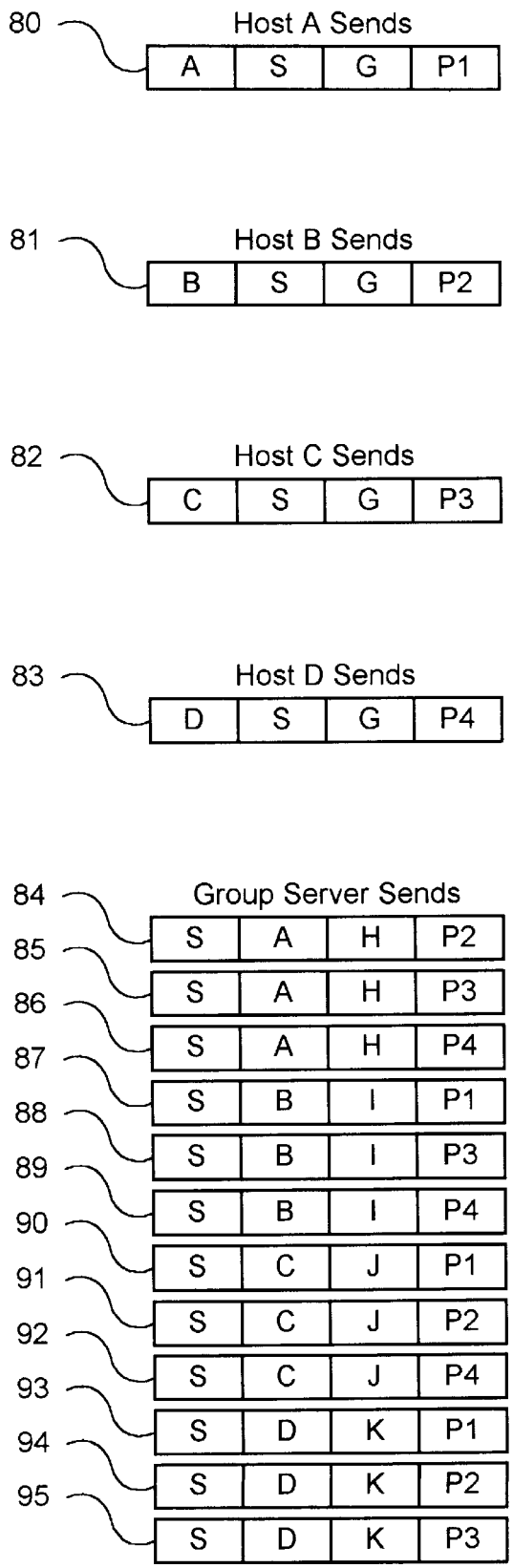
FIG. 6 shows the ULP datagrams without payload aggregation on a network according to the present invention that would be needed to implement an interactive application between four hosts.
Figure 6:
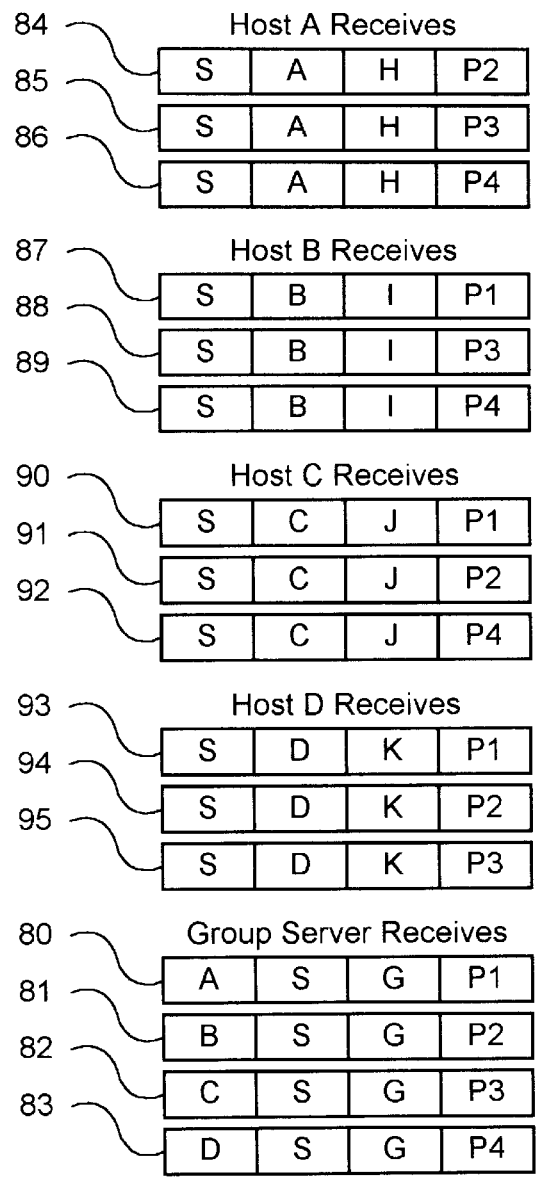
Figure 7:
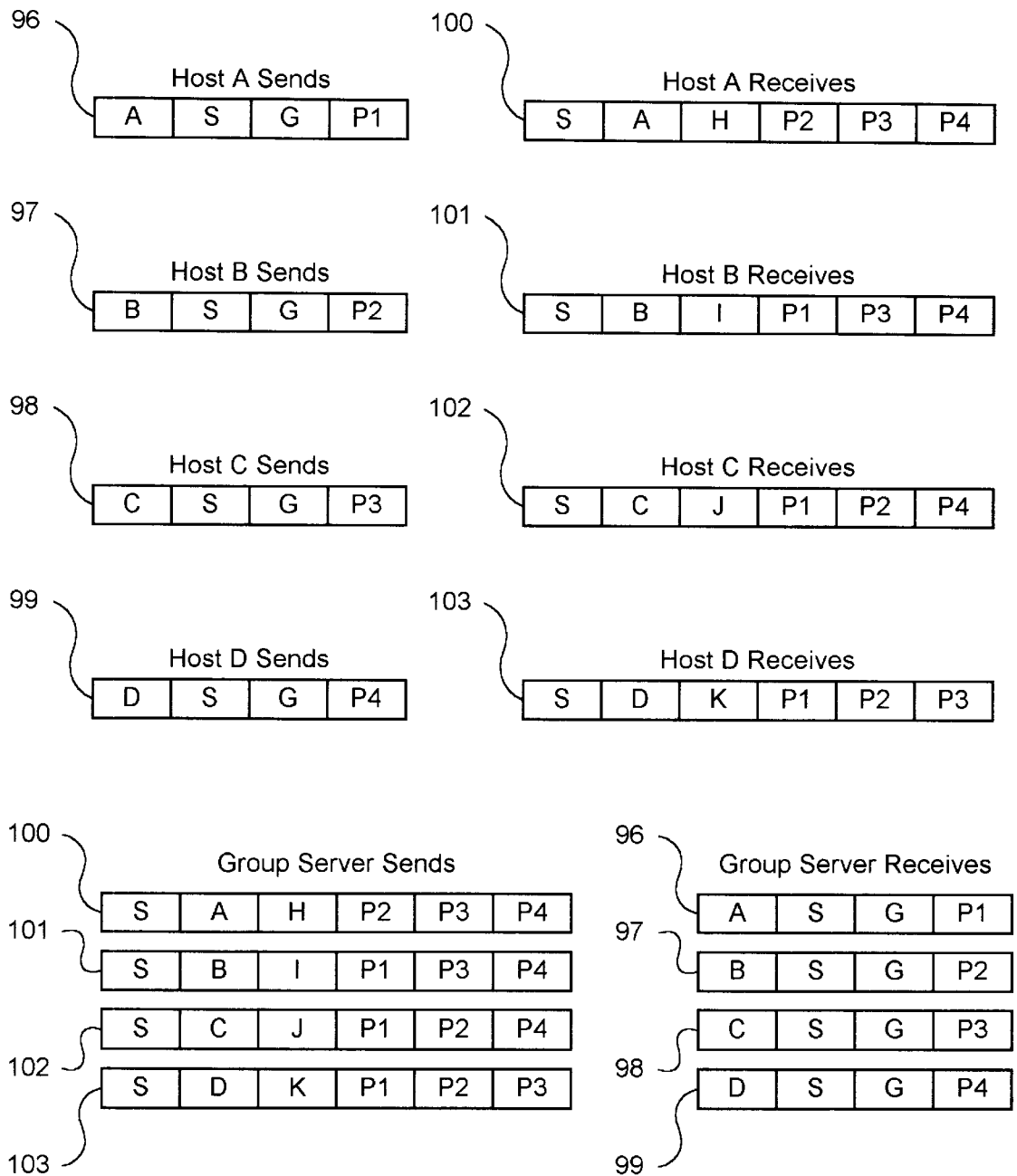
FIG. 7 shows the ULP datagrams with payload aggregation on a network according to the present invention that would be needed to implement an interactive application between four hosts.
Figure 8:
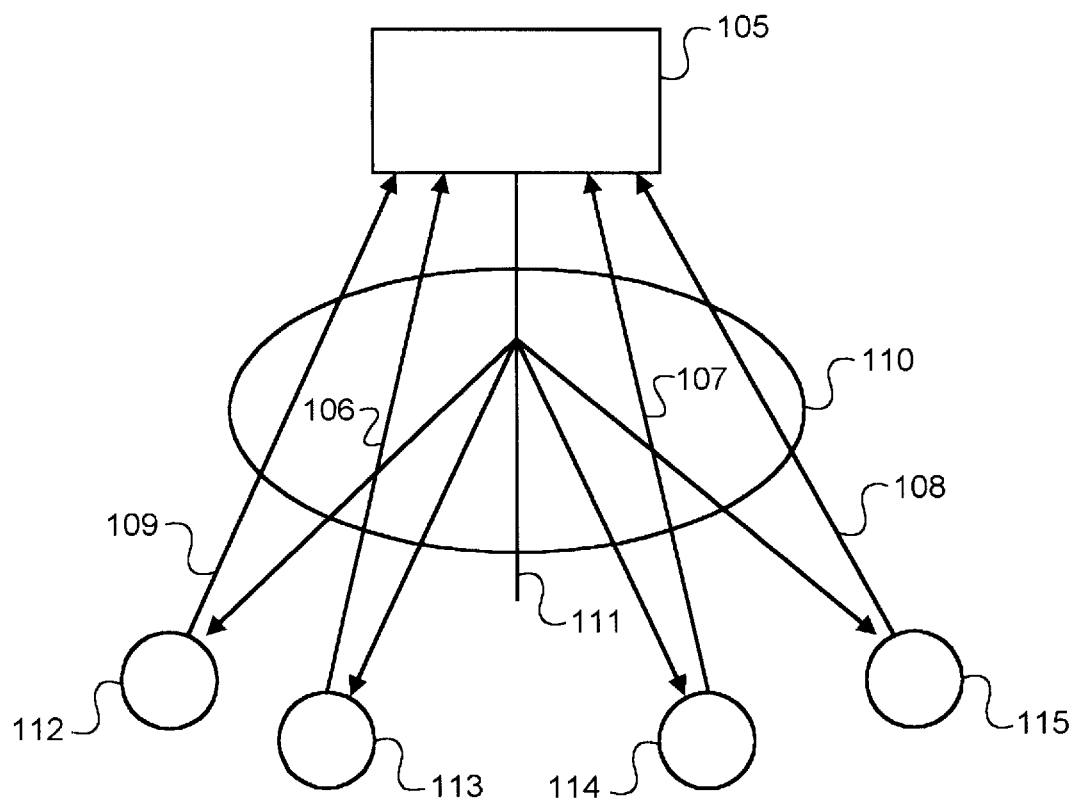
FIG. 8 shows a prior art ATM network with a multicast server.

In FIG. 5, hosts 58, 59, 60 and 61 send messages to one another using the ULP over a conventional unicast network using a group messaging server 62. The network consists of conventional routers 63, 64, 65, 66, 67 and 68 connected with conventional network links 69, 70, 71, 72, 73, 74, 75, 76 and 77. Host 58 can send a message to hosts 59, 60 and 61 by sending a single ULP message to the group messaging server 62 where the ULP message specifies a destination address that is a ULP message group. The ULP message is encapsulated in a TLP message addressed to the group messaging server. This causes the message to be properly routed by router 63 to network link 71 to router 67 to the server 62. The group messaging server receives the ULP message and determines that the message is addressed to a message group containing hosts 59, 60 and 61 as members. The server sends the payload of the received message to each of the hosts in three new ULP messages individually sent to the three hosts. Since each message is encapsulated in a TLP message, the messages are properly carried over the conventional unicast network. The first ULP message is sent by the group messaging server to host 61. This message is carried by network links 71, 70, 72 and 75 and routers 67, 63, 64 and 65. The second ULP message is sent by the group messaging server to host 60. This message is carried by network links 71, 70, 73 and 76 and routers 67, 63, 64 and 66. The third ULP message is sent by the group messaging server to host 61. This message is carried by network links 74 and 77 and routers 67 and 68.

The invention can be implemented both in a datagram form and in a connection oriented form. To best understand the details of the invention, it is best to first consider a datagram implementation.

Datagram Transport Implementation

Figure 9:
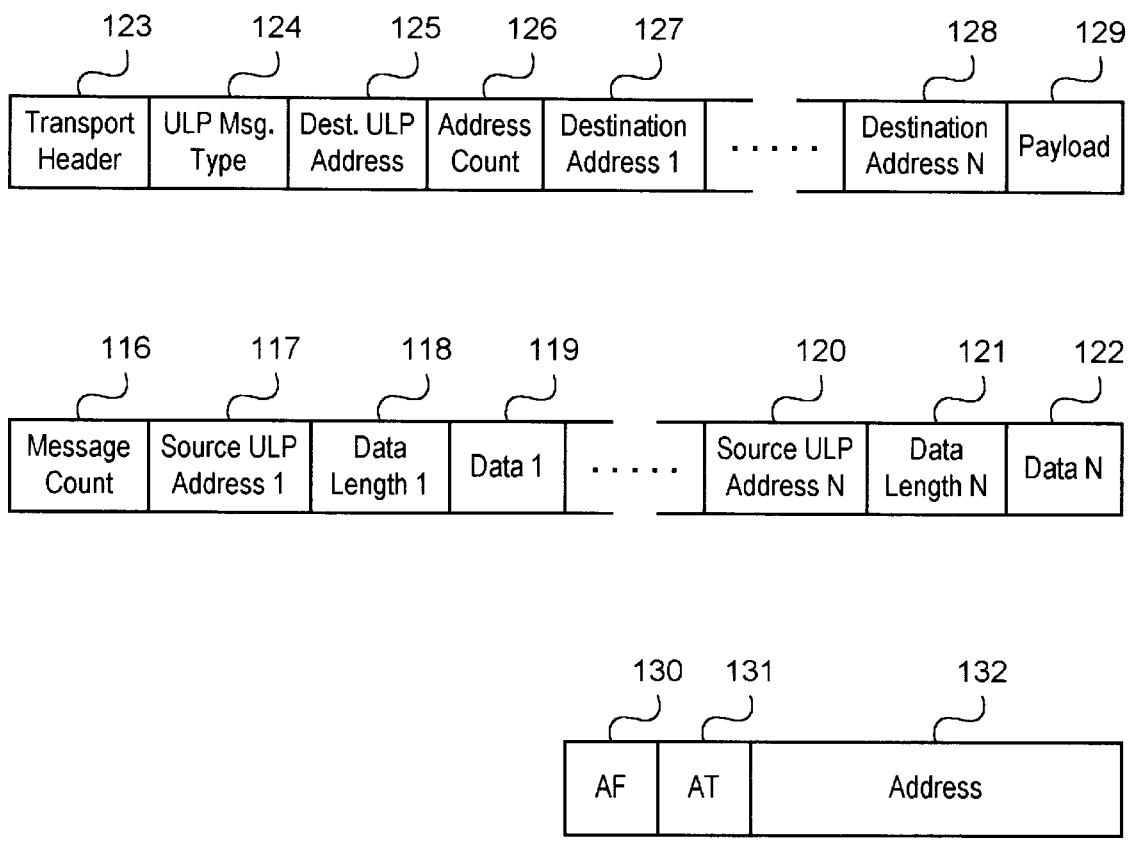
FIG. 9 shows the detailed datagram format and address format for ULP messages in accordance with the present invention.

The ULP can be implemented as a datagram protocol by encapsulating addresses, message type information and the message payload within a datagram of the underlying network transport protocol. The general form of the ULP datagram message format is shown in FIG. 9 as elements 123, 124, 125, 126, 127, 128 and 129. The transport header 123 is the datagram header of the TLP that is encapsulating the ULP datagram. The ULP message type field 124 indicates whether it is a send or receive message, if it is a control message or a state message. The following table shows the different message types. The ULP message type field must be present in a ULP datagram.

| Message Types | |
|---|---|
| 1 | Send |
| 2 | Receive |
| 3 | Send Control |
| 4 | Receive Control |
| 5 | Send State |
| 6 | Receive State |

Send messages are always sent from a host to a group messaging server. Messages from a group server to the hosts are always receive messages. Send Control messages are messages from hosts to a group messaging server requesting a control function be performed. Receive Control messages are acknowledgments from a group messaging server to the hosts in response to a prior Send Control messages. The Send and Receive State messages are special cases of the Send and Receive Control messages that allow hosts to read and write application specific state storage in the group messaging server. The specific control functions supported by the ULP will be explained later.

The destination ULP address 125 is required in ULP datagrams and specifies the primary destination of the ULP message. The address count field 126 is required in ULP send message types and is not present in ULP receive message types. When the address count field in a ULP send message is non-zero, it specifies the number of auxiliary destination addresses for the send message that follow the address count field. These auxiliary destination addresses are shown as items 127 and 128, but it is understood that there are as many auxiliary ULP destination addresses as specified by the address count field. Finally there is the payload 129.

The payload format for ULP datagrams is defined by items 116, 117, 118, 119, 120, 121 and 122. Item 116 is the message count and defines how many payload elements will be contained in the payload. A single payload element consists of a triplet of source ULP address, data length and data. Items 117, 118 and 119 comprise the first payload element of the payload. Item 117 is the ULP address of the source of the payload element, item 118 is the data length for the data in the payload element and item 119 is the actual data. Items 120, 121 and 122 comprise the last payload element in the payload. ULP send messages only support payloads with a single payload element, so the message count is required to be equal to one. ULP receive messages may have payloads with one or more payload elements.

ULP Address Space

The address space of the ULP is divided into three segments: unicast host addresses, implicit group addresses and logical group addresses. All source and destination addresses in ULP must be in this address space. The ULP address space is unique to a single group messaging server. Therefore each group messaging server has a unique ULP address space. Multiple group messaging servers may be connected to the network and hosts may communicate with multiple group messaging servers without confusion since each ULP datagram contains the header of the TLP. Different group messaging servers will have unique TLP addresses which can be used by the hosts to uniquely identify multiple ULP address spaces. The format for ULP addresses is shown in FIG. 9 comprised of items 130, 131 and 132. The address format field 130 is a variable length field used to allow multiple address lengths to be supported. The address type field 131 indicates the type of ULP address: unicast host, implicit group or logical group. The encoding is as follows:

| Address Type Encoding | |
|---|---|
| 0 0 | Unicast Host Address |
| 0 1 | Unicast Host Address |
| 1 0 | Implicit Group Address |
| 1 1 | Logical Group Address |

The address format encoding determines the length of the address field and therefore the total length of the ULP address. This encoding is shown below. Note that when the address type specifies a unicast host address, the low bit of the address type field is concatenated to the address field to become the most significant bit of the address. This doubles the size of the address space for unicast host addresses which is useful since there will generally be more hosts than group messaging servers.

| Address Format Encoding | |
|---|---|
| 0 | 29 Bit Address Field |
| 1 0 | 4 Bit Address Field |
| 1 1 0 | 11 Bit Address Field |

ULP unicast host addresses are assigned to each host when it first connects to a group messaging server. When a host sends a message to other ULP address, the unicast ULP address of the host will appear as the source ULP address in the received payload element. Unicast ULP host addresses can also be used as destination addresses only as auxiliary addresses in a ULP send message. They are not allowed to be used to as the primary ULP destination address. This means that hosts cannot send ULP directly to one another, but always must send the messages to one another through a group messaging server.

Implicit group addresses are created by a group messaging server in response to a control message to the server requesting the creation of an implicit message group. The host requesting the creation of the implicit message group becomes a member of the message group when it is created. Other hosts can send inquiry control messages to the group messaging server to learn of its existence and then send a implicit group join message in order to join the group. The group messaging server maintains a list of ULP addresses of hosts that are members of the implicit message group. Implicit ULP group addresses are the only ULP addresses allowed to be the primary destination of a ULP send message. Implicit ULP addresses will never appear as ULP source addresses in a payload element.

Logical ULP addresses are used both to address logical message groups and for specifying set operations between the group members of the auxiliary ULP addresses in a ULP send message. Logical message groups are created and joined similarly to implicit message groups, however, logical ULP addresses may only be used as auxiliary ULP addresses in a ULP send message. Logical ULP addresses will also never appear as source ULP addresses in a payload element. The support of set operations between message groups as part of a ULP send message will be explained in a later section on ULP send messages.

Group Messaging Server Internal Functions

Figure 10:
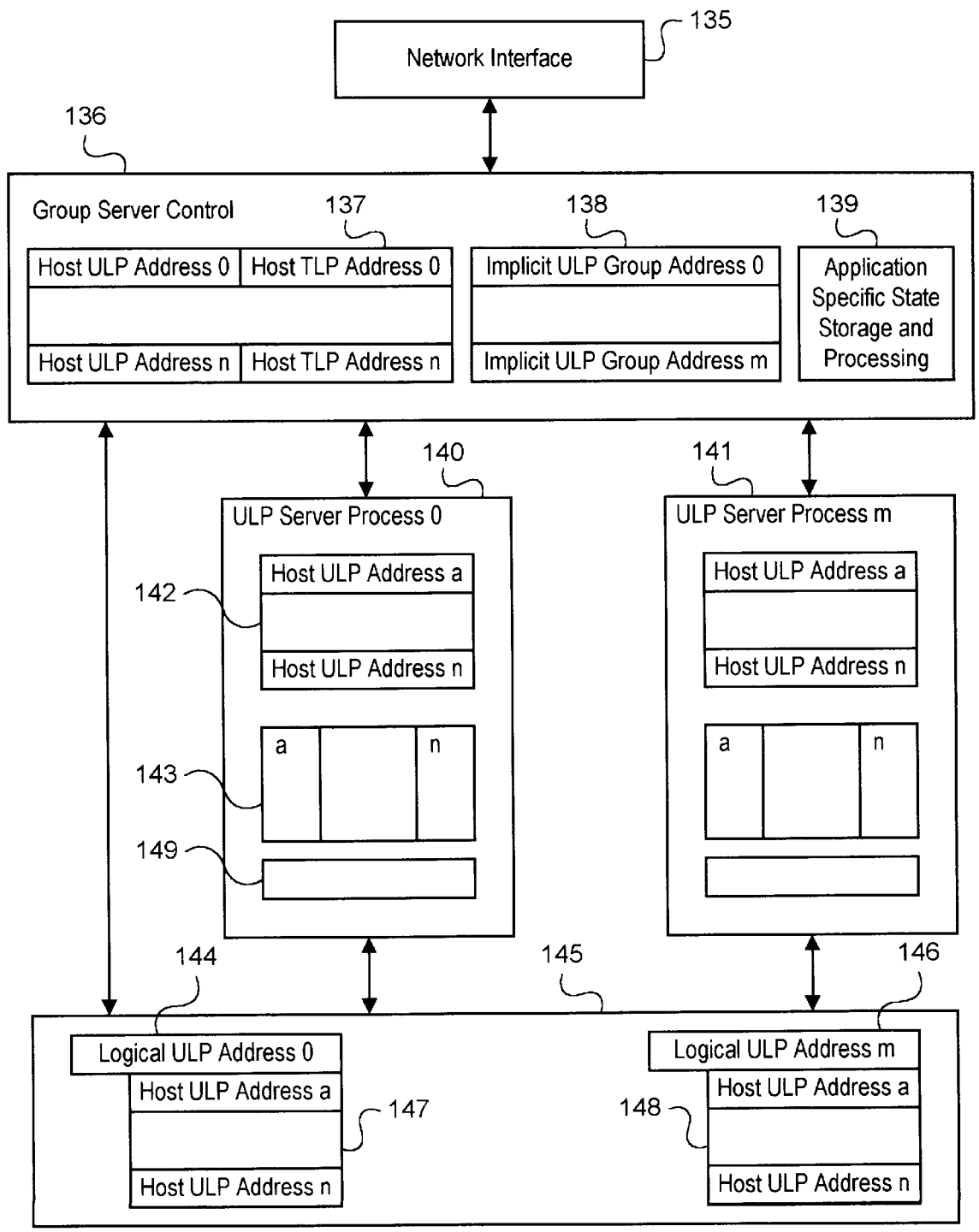
FIG. 10 shows the internal functions of the GMS according to the present invention.

The internal components of the group messaging server are shown in FIG. 10.

In the preferred embodiment, the group messaging server is a general purpose computer system with a network interface to connect it to a wide area network. Item 135 is the network interface for the group messaging server and includes not only the hardware connection to the network but the communications protocol stack used to implement the TLP on the server.

Item 136 is an overall control function for the group messaging server. This control function is responsible for all ULP messages that are sent or received by the GMS. Internal to this control function are several important storage and processing functions. Item 137 is an address map for all hosts currently connected to the GMS. This address map is a list of the ULP host address of each host connected to GMS and its corresponding TLP address. This enables the control function to construct the necessary TLP headers for sending ULP messages to the hosts connected to the GMS. Item 138 is a list of all of the currently active implicit ULP addresses currently recognized by the GMS. Item 139 is an application specific state storage and processing function. Many interactive applications deployed over a network will be able to be implemented solely with host based processing. In these cases all data that needs to be sent between the hosts can be transported using the ULP. However, some applications will need maintain a centrally stored and maintained repository of application state information. This is useful when hosts may join or leave the application dynamically. When hosts join such an application, they will need a place from which they can obtain a snapshot of the current state of the application in order to be consistent with the other hosts that already where part of the application. To read and write this state storage area, the ULP supports send and receive state message types. Within these messages, there is the ability to access a state address space so that different portions of the state can be individually accessed. Application specific processing of state written into this state storage area can also be implemented.

Items 140 and 141 are two of multiple ULP server processes running on the GMS. These are software processes that are at the heart of the ULP. Each implicit ULP addresses recognized by the GMS has a one-to-one correspondence to a ULP server process and to a message group maintained by the process. Since all ULP send messages must have an implicit ULP address as the primary destination address of the message, every ULP send message is sent to and processed by a ULP server process. These processes are created by the GMS control function in response to ULP control messages to create new implicit ULP addresses. They are destroyed when the last host which is a member of its message group has left the message group. Internal to a ULP server process is a list, 142, of the ULP host addresses of the members of the message group, a set of message queues 143 for each host which is a member of the message group and a message aggregation function 149 which is used to aggregate multiple messages to a single host into a single message.

Item 145 maintains a list of all of the logical ULP addresses and message groups in the GMS. Items 144 and 146 represent two of multiple logical ULP addresses. For each logical ULP address, there is a corresponding list, 147 and 148 of the host ULP addresses of the members of the logical message group. The logical message groups are not tied to specific ULP server processes, but are global with a GMS to all of the ULP server processes.

Control Functions

The control functions consist of connect, disconnect, create group, close group, join group, leave group, query groups, query group members, query group attributes. These control functions are implemented by a ULP send and receive control messages. The control functions are initiated by a host sending a ULP send control message to a GMS. These messages only allow a primary ULP destination address in the message and do no allow auxiliary addresses. The primary ULP address is interpreted as a control address space with a unique fixed address assigned to each of the control functions enumerated above. The contents of data in the payload supplies any arguments needed by the control function. Returned values from the control function are returned in a ULP receive control message that is addressed to the host that sent the original control message for which data is being returned. The detailed operation of these control functions is described below.

Connect

This control function allows a host to connect to a GMS. The destination ULP address in the message is a fixed address that indicates the connect function. The source ULP address and any data in the payload are ignored.

Upon receiving this message, the GMS control function, 136, creates a new host address and enters the host address in the host address map 136 along with the source TLP address from the TLP header of the message. Upon successful completion, the GMS control function responds with a receive control ULP message addressed to the host along with a function code in the data portion of the payload that indicates successful host connection. The destination ULP address in the message is the ULP address assigned to the host. The host saves this and uses it for any future messages to the GMS. If there is an error, the control function returns a message to the host with a function code in the data portion of the payload indicating failed host connection.

Disconnect

This function allows a host to disconnect from a GMS. The destination ULP address in the message is a fixed address that indicates the disconnect function. The source ULP address is used to remove the host from membership in any implicit or logical groups prior to disconnecting. Any data in the payload is ignored. The GMS control function also removes the entry for the host from the host address map. Upon successful completion, the GMS control function responds with a receive control ULP message addressed to the host along with a function code in the data portion of the payload that indicates successful host disconnection. The destination ULP address in the message is the ULP address assigned to the host. If there is an error, the control function returns a message to the host with a function code in the data portion of the payload indicating failed host disconnection.

Create implicit group

This function allows a host to create a new implicit message group and associated implicit ULP address and server process. The payload in the message may contain a single payload item whose data field holds attributes of the group. These attributes can be used to define any optional functions of the group. The destination ULP address in the message is a fixed address that indicates the create implicit group function. The GMS control function allocates a new implicit ULP address, adds it to the implicit ULP address list 138 and creates a new ULP server process 140. The host that sends this message is added to the membership list of the implicit group. This is done by adding the source ULP address in the message to the group membership list 142 in the ULP server process. Upon successful completion, the GMS control function responds with a receive control ULP message addressed to the host along with a function code in the data portion of the payload that indicates successful implicit group creation. The source ULP address in the payload is the ULP address assigned to the new implicit group. If there is an error, the control function returns a message to the host with a function code in the data portion of the payload indicating failed implicit group creation.

Create logical group

This function allows a host to create a new logical message group and associated logical ULP address. The payload in the message may contain a single payload item whose data field holds attributes of the group. These attributes can be used to define any optional functions of the group The destination ULP address in the message is a fixed address that indicates the create logical group function. The GMS control function allocates a new logical ULP address and adds it to the logical ULP address list 145. The host that sends this message is added to the membership list of the logical group. This is done by adding the source ULP address in the message to the group membership list 147 for the new logical message group 144. Upon successful completion, the GMS control function responds with a receive control ULP message addressed to the host along with a function code in the data portion of the payload that indicates successful logical group creation. The source ULP address in the payload is the ULP address assigned to the new logical group. If there is an error, the control function returns a message to the host with a function code in the data portion of the payload indicating failed implicit group creation.

Join group

This function allows a host to join an existing logical or implicit message group. The destination ULP address in the message is a fixed address that indicates the join group function. The data portion of the payload contains the ULP address of the group that is to be joined. The GMS control function looks at this address and determines if it is an implicit or logical ULP address. If it is an implicit ULP address, the GMS control function finds the ULP server process selected by the address in the message payload and adds the source ULP host address from the message to the group membership list 142. If it is a logical ULP address, the GMS control function finds the logical ULP address 144 selected by the address in the message payload and adds the source ULP host address from the message to the group membership list 147. Upon successful completion, the GMS control function responds with a receive control ULP message addressed to the host along with a function code in the data portion of the payload that indicates successful group join. The source ULP address in the payload is the ULP address of the group that was joined. If there is an error, the control function returns a message to the host with a function code in the data portion of the payload indicating failed implicit group creation.

Leave group

This function allows a host to leave an existing logical or implicit message group that it is a member of The destination ULP address in the message is a fixed address that indicates the leave group function. The data portion of the payload contains the ULP address of the group that is to be left. The GMS control function looks at this address and determines if it is an implicit or logical ULP address. If it is an implicit ULP address, the GMS control function finds the ULP server process selected by the address in the message payload and removes from the group membership list 142 the source ULP host address from the message. If the host is the last member of the group, the ULP server process is terminated and the implicit ULP address is de-allocated. If it is a logical ULP address, the GMS control function finds the logical ULP address 144 selected by the address in the message payload and removes from the group membership list 147 the source ULP host address from the. If the host is the last member of the group, the ULP address is de-allocated. Upon successful completion, the GMS control function responds with a receive control ULP message addressed to the host along with a function code in the data portion of the payload that indicates successful group leave. If there is an error, the control function returns a message to the host with a function code in the data portion of the payload indicating failed implicit group creation.

Query groups

This function allows a host to get a list of all implicit and logical message groups currently active on a GMS. The destination ULP address in the message is a fixed address that indicates the query groups function. Any data portion of the payload is ignored. Upon successful completion, the GMS control function responds with a receive control ULP message addressed to the host along with a payload with multiple payload elements. The first payload element contains a function code indicating successful query groups. The source ULP address in the first payload element is ignored. Each of the subsequent payload elements contain a ULP group address in the source address field of the payload element that is one of the active group addresses on the GMS. There is no data field in these subsequent payload elements. If there is an error, the control function returns a message to the host with a function code in the data portion of a payload with a single payload element indicating failed query groups.

Query group members

This function allows a host to get a list of all hosts that are members of a message group. The destination ULP address in the message is a fixed address that indicates the query group members function. The data portion of the payload carries the address of the message group for the query. Upon successful completion, the GMS control function responds with a receive control ULP message addressed to the host along with a payload with multiple payload elements. The first payload element contains a function code indicating successful query group members. The source ULP address in the first payload element is ignored. Each of the subsequent payload elements contain a ULP host address in the source address field of the payload element that is one of the active group addresses on the GMS. There is no data field in these subsequent payload elements. If there is an error, the control function returns a message to the host with a function code in the data portion of a payload with a single payload element indicating failed query group members.

Query group attributes

This function allows a host to get a list of the attributes of a message group. The destination ULP address in the message is a fixed address that indicates the query group attributes function. The data portion of the payload carries the address of the message group for the query. Upon successful completion, the GMS control function responds with a receive control ULP message addressed to the host along with a payload with a two payload elements. The first payload element contains a function code indicating successful query group members. The second payload element contains the attributes of the message group. If there is an error, the control function returns a message to the host with a function code in the data portion of a payload with a single payload element indicating failed query group attributes.

Send Message Operation

In order to fully understand the operations of the send message function, a number of individual cases are worth considering.

Single implicit destination

The most simple case is a send message to a single implicit ULP address. In all send message datagrams, the destination ULP address 125 must be an implicit ULP address. In this case of a single implicit destination, this is the only destination address in the datagram. The auxiliary address count 126 is zero and there are no auxiliary destination addresses 127 or 128. The payload consists of a message count 116 of one, the ULP of the host sending the message in the source ULP address 117 and the data length 118 and data 119. Send message datagrams may only have a single payload item so their message count field 116 must always be one.

The host sends the send message onto the network with a TLP header addressing the data. The GMS the GMS that is the selected target of the message. The GMS receives the message and the GMS control function 136 determines that it is a send message datagram and looks up the implicit destination address in its implicit ULP address list 138. If the address does not exist, an error message is returned to the sending host with a ULP receive message datagram. If the address is valid, the GMS control function removes the TLP header from the datagram and sends the ULP portion to the ULP server process corresponding to the destination implicit ULP address. Assume for discussion that this is the ULP server process 140. The ULP server process 140 will extract the single payload item from the message 117, 118 and 119 and place the payload item in each of the message queues 143. There will be one message queue for each member of the message group served by the ULP server process 140. The members of the group will have their host ULP addresses listed in the host address list 142. Each message queue in a ULP server process will fill with payload items that are targeted at particular destination hosts. The mechanisms by which payload items are removed from the queues and sent to the hosts will be described later.

Auxiliary unicast destination

In this case in addition to an implicit destination 125, there is also a single auxiliary address 127 in the datagram. The auxiliary address count 126 is one and the auxiliary destination addresses 127 is a unicast host ULP address. The payload consists of a message count 116 of one, the ULP of the host sending the message in the source ULP address 117 and the data length 118 and data 119.

The host sends the send message onto the network with a TLP header addressing the datagram to the GMS that is the selected target of the message. The GMS receives the message and the GMS control function 136 determines that it is a send message datagram and looks up the implicit destination address in its implicit ULP address list 138 and the unicast host ULP auxiliary address in the host address map 137. If either of addresses does not exist, an error message is returned to the sending host with a ULP receive message datagram. If the addresses are valid, the GMS control function removes the TLP header from the datagram and sends the ULP portion to the ULP server process corresponding to the destination implicit ULP address. Assume for discussion that this is the ULP server process 140. The ULP server process extracts the auxiliary ULP address from the message and determines from the address that it is a unicast host ULP address. The server process then checks to see if this address is a member of the message group defined by the host address list 142. If it is not, no further action is taken and the payload item in the message is not placed in any of the message queues 143. If the host address is in the message group, the payload item in the message is placed in the single message queue corresponding to that host. The net effect is that the ULP server process has performed a set intersection operation on the members of the message group selected by the implicit ULP destination address and defined by the group membership list 142 with the members of the set of hosts defined by the auxiliary address. The payload item is them sent only to the hosts that are members of this set intersection.

Auxiliary logical destination

In this case in addition to an implicit destination 125, there is also a single auxiliary address 127 in the datagram. The auxiliary address count 126 is one and the auxiliary destination addresses 127 is a logical ULP address. The payload consists of a message count 116 of one, the ULP of the host sending the message in the source ULP address 117 and the data length 118 and data 119.

The host sends the send message onto the network with a TLP header addressing the datagram to the GMS that is the selected target of the message. The GMS receives the message and the GMS control function 136 determines that it is a send message datagram and looks up the implicit destination address in its implicit ULP address list 138 and the logical ULP auxiliary address in list of logical ULP addresses 145. If either of addresses does not exist, an error message is returned to the sending host with a ULP receive message datagram. If the addresses are valid, the GMS control function removes the TLP header from the datagram and sends the ULP portion to the ULP server process corresponding to the destination implicit ULP address. Assume for discussion that this is the ULP server process 140. The ULP server process extracts the auxiliary ULP address from the message and determines from the address that it is a logical ULP address. Assume for this example that this logical ULP address is the logical address 144. The server process fetches the group membership list 147 corresponding to the logical address and performs a set intersection operation with the group membership list 142 of the server process. If there are no members of this set intersection, no further action is taken and the payload item in the message is not placed in any of the message queues 143. If there are members of the set intersection operation, the payload item in the message is placed in the queues corresponding to the hosts that are members of the set intersection.

Multiple auxiliary addresses with logical operations

In its most sophisticated form, a send message can perform set operations between the implicit message group of the ULP server process and multiple logical and unicast ULP addresses. This is done by placing multiple auxiliary destination ULP addresses in the message with logical operators imbedded in the address list. The address count 126 holds a count of the total auxiliary addresses in the address list 127 and 128. The auxiliary addresses are a mix of logical ULP addresses and unicast host ULP addresses. Two logical ULP addresses in the ULP address space are assigned the role of specifying set operations to be performed between the logical message groups and unicast host addresses in the message list. They are specially assigned addresses for the functions set intersection, set union. A third logical address is used to indicate set complement. The payload consists of a message count 116 of one, the ULP of the host sending the message in the source ULP address 117 and the data length 118 and data 119.

The host sends the send message onto the network with a TLP header addressing the datagram to the GMS that is the selected target of the message. The GMS receives the message and the GMS control function 136 determines that it is a send message datagram and looks up the implicit ULP message in the implicit ULP address list 138 and all of the addresses in the address list either in the host ULP address map 137 or in the logical ULP address list 145 as appropriate. If any of addresses does not exist, an error message is returned to the sending host with a ULP receive message datagram. If the addresses are valid, the GMS control function removes the TLP header from the datagram and sends the ULP portion to the ULP server process corresponding to the destination implicit ULP address. Assume for discussion that this is the ULP server process 140. The ULP server process extracts the auxiliary ULP address list from the message and scans it from beginning to end. The scanning and processing of the set operators is done in post-fix fashion. This means that arguments are read followed by an operator that is then applied to the arguments. The result of the operator becomes the first argument of the next operation. Therefore at the start of scanning two addresses are read from the address list. The next address will be an operator that is applied to the arguments and the result of this operator is the first argument to be used by the next operator. From then on a single address is read from the address list followed by a logical ULP address which is operator on the two arguments consisting of the new argument and the results of the last operator. The logical address used to indicate set complement is not a set operator, by an argument qualifier since it can precede any address in the address list. The meaning of the set complement argument qualifier is relative to the group membership of implicit group address in the send message. If the set complement qualifier precedes a unicast host address which is not a member of the message group selected by the implicit ULP address in the send message, the effective argument is the set of all hosts that are members of the implicit message group. If the set complement qualifier precedes a unicast host address which is a member of the message group selected by the implicit ULJP address in the send message, the effective argument is the set of all hosts that are members of the implicit message group except for the original unicast host address qualified by the complement function. If the set complement qualifier precedes a logical ULP address the effective argument is the set of all hosts that are members of the implicit message group specified by the send message except hosts that are members of the logical message group preceded by the set complement modifier. Once the entire address list has been processed to a single result set of hosts, a set intersection operation is performed on this set and the set of members of the implicit message group 142 defined by the implicit address in the send message. If there are no members of this set intersection, no further action is taken and the payload item in the message is not placed in any of the message queues 143. If there are members of the set intersection operation, the payload item in the message is placed in the queues corresponding to the hosts that are members of the set intersection.

Message Delivery and Aggregation

Once messages are entered into the message queues in the ULP server processes, there are a variety of ways that they can ultimately be delivered to the targeted hosts. In the invention, the delivery method is set on a per-ULP server process basis by attributes that are provided at the time that an implicit ULP message group and server process are created. It is important during the description of these methods to keep in mind that the invention is intended to provide an efficient means for a group of hosts to send messages to each other at a rapid rate during the implementation of a networked interactive application. Also assumed in the following description is that the GMS performs echo suppression when a host sends a message to a group that it belongs to. This means that the host will not receive a copy of its own message to the group either as a single un-aggregated message or as a payload item in an aggregated message. This is controlled by a ULP server process attribute that can be changed to stop echo suppression, but echo suppression is the default.

Immediate Delivery

The most simple delivery method is to immediately deliver the payload items to their targeted hosts as soon as they are placed in the message queues. Each payload item in a message queue will contain a ULP source address, a data length and the data to be sent. To implement immediate delivery, the ULP server process will remove a payload item from a message queue for a particular host 143. The host address for this host will be obtained from the group membership list 142. The payload item and the destination host address will be sent to the GMS control function 136 where it will be used to create a ULP receive message sent to the destination host. The GMS control function 136 will use the destination ULP host address to look up the TLP address of the host from the host address map 137. This will be used to create a TLP header for the message 123. The ULP message type 124 will be ULP receive, the destination ULP address 125 will be the destination host, the address count will be 0 and there will be no auxiliary addresses. The payload in this case will have a message count 116 of 1 and the payload item comprised of fields 117, 118, and 119 will be the payload element taken from the message queue.

Immediate delivery is useful when the message rate between a group of hosts is low. Consider four hosts that are members of an implicit message group where each member of the group sends a message to every other member of the group at a fixed rate. With immediate delivery, each host will send three messages to the other members of the group and receive three messages from the other members of the group at the fixed rate. This is acceptable is the size of the group is small and the message rate is low. However, it is obvious that total message rate is the product of the underlying message rate and the total number of members of the group minus one. Clearly this will result in unacceptably high message rates for large groups and highly interactive message rates. A group of 20 members that had an underlying message rate of 10 messages per second would yield a total message rate at each host of 190 messages sent and 190 messages received every second. This message rate will be unsupportable over a conventional dial-up connection to a conventional wide area network such as the internet.

Aggregation

A key concept in the present invention is the aggregation of multiple messages in a message queue into a single ULP receive message to a host that contains multiple payload items in the payload. The ULP server process 140 removes payload items from a message queue 143 for a host and accumulates them in an aggregation buffer 149. The aggregation buffer has buffer areas for each host for which there is a message queue. These individual host areas within the aggregation buffer are called host aggregation buffers. The start and end of this aggregation period can be controlled in a number of ways that will be described in the next sections. At the end of the aggregation period, the each host aggregation buffer may hold multiple payload items. The host aggregation buffer will hold a message count of the payload items followed by the multiple payload items. The contents of a host aggregation buffer along with the ULP host address of the corresponding host are sent to the GMS control function 136 where it will be used to create a ULP receive message sent to the destination host. The GMS control function 136 will use the destination ULP host address to look up the TLP address of the host from the host address map 137. This will be used to create a TLP header for the message 123. The ULP message type 124 will be ULP receive, the destination ULP address 125 will be the destination host, the address count will be 0 and there will be no auxiliary addresses. The payload in this case will have a message count 116 set by the message count value from the host aggregation buffer. The payload will contain all of the payload items from the host aggregation buffer.

The effect of aggregation will be to greatly reduce the total message rate received by the hosts. A single message to a host will be able to carry multiple payload items received from the other hosts during the aggregation period. This fits very well the interactive applications of this invention where groups of hosts will be sending messages to all the other hosts in the group at a periodic rate. Aggregation will be very effective in collecting together all of the messages from all of the other hosts into a single message for each member of the group. The reduces processing at each receiving host since a single message will be received rather than many separate messages. Aggregation will also reduce the total data rate to the hosts since aggregation eliminates the need for separate message headers for each payload item. The savings will be significant for small payload items since there will be only one message header comprising fields 123, 124 and 125 for multiple payload items. In cases where a group of hosts are sending messages to the group at a periodic rate, it is often the case in many interactive applications that the data being sent by each host to the group is very similar to the messages sent by the other hosts. This affords the opportunity within an aggregated payload of multiple payload items to apply a data compression method across the multiple data elements of the payload elements. A wide variety of known data compression methods will lend themselves to this application. The first data element in the first payload item can be sent in uncompressed form with each subsequent data element being compressed using some form of difference coding method. A variety of known data compression methods use the concept of a predictor with differences from the predicted value being encoded. The first data element in an aggregated payload can be used as this predictor with the subsequent data elements coded using such a data compression method. These conventional data compression methods do not assume any knowledge of the internal structure or function of portions of a data element to compress. It is also possible to make use of application specific coding techniques that take advantage of such knowledge to potentially achieve much higher coding efficiency.

Server Isochronous

One method by which the aggregation time period can be defined is called Server Isochronous or SI. In this method, A ULP Server Process defines a uniform time base for defining the aggregation time period. This time base is defined by three parameters: the time period, the aggregation offset and the transmit offset. These parameters are set by the attributes provided in the create implicit group control function at the time the implicit group and the ULP server process are created. The time period is a fixed time interval during which the ULP server process will accumulate messages in the message queues, aggregate the messages in the queues and send the aggregated messages to the targeted hosts. The aggregation offset defines the point after the start of the time period after which arriving messages will be stored in the message queues for delivery in the next time period.

Therefore, at the aggregation offset after the start of the time period, a snapshot will be taken of all of the messages in each message queue. New messages will continue to arrive and be entered into the queues after the aggregation offset. Only those messages in the queues before the aggregation offset point will be aggregated into outbound messages. The resulting aggregated messages will then be sent to their targeted hosts at the point in time which is the transmit offset after the start of the time period. The result is that messages arrive continuously and are stored in the message queues. Once per time period the are aggregated into single messages to each host which is the target of messages and once per time period these aggregated messages are sent to the hosts.

Another embodiment of the SI method is to allow the ULP server process to dynamically vary the time period based on some criteria such as the received message rates, and/or received data rate. The ULP server could use a function to define the aggregation period based on the number of messages received per second or the total number of payload bytes received per second. One reasonable function would be to shorten the aggregation period as the rate or received messages or data rate of the received payloads increased. This would tend to keep the size of the outbound messages from growing too much as received messages and/or received data rate grew. Other possible functions could be used that varied the aggregation period based on received message rates, received payload data rates or other parameters available to the ULP server process.

Host Synchronous

The host synchronous or HS method of defining the aggregation time period allows the definition of a flexible time period that is controlled by the hosts. It is based on the concept of a turn which is a host sending a message to one or more members of the implicit message group which is operating is HS mode. Once every host in the message group has taken a turn, the aggregation period ends. A snapshot of the contents of the message queues is taken, the contents of each of the queues is aggregated and the aggregated messages are sent to the hosts targeted by each message queue. A refinement to this technique qualifies which of the three ULP send message types to the group constitute a host turn: a send only to the implicit address of the group, a send to a unicast host address within the group or a send to a logical ULP address which shares members with the group. The attributes of the group not only will define HS aggregation, but one or more ULP send message types that will be considered a host turn. A further refinement sets the total number of turns that a host can take in a single aggregation time period. The default will be one turn, but multiple turns can be allowed. If a host attempts to take more turns than allowed, the messages are ignored.

This aggregation technique has the additional benefit of causing the hosts which are member of an HS implicit message group to have their processing functions synchronized when they are executing the same interactive application. Many networked interactive applications are based on a simple overall three step operational model: wait for messages from other hosts, process the messages and the local users inputs to update the local application, send messages to the other hosts. This basic application loop is repeated at a rate fast enough to provide an interactive experience such as 5 to 30 times per second. It is desirable to keep such applications synchronized so that the states of the applications is consistent on the different host machines. When such applications communicate using the HS model of the present invention their operations will become naturally synchronized. The HS ULP server process will wait until all of the members of the message group has completed their turns and sent a message to the group before sending the aggregated messages to the members of the group. This will cause the applications on the hosts to wait until they have received the aggregated messages. They will all then start processing these messages along with the local user inputs. Even if they perform their processing at different speeds and send their next messages to the group at different times, the HS ULP server will wait until all have completed their processing and reported in with a message to the group. This will keep all of the host applications synchronized in that every host will be at the same application loop iteration as all of the others. This will keep the application state consistent on all of the hosts. Only network propagation delays from the GMS to the hosts and different processing speeds of the hosts will cause the start and completion of their processing to begin at different times. It is not a requirement in networked applications to keep all of the hosts precisely synchronized, only that that application state is consistent. The HS method provides a natural way to do this in the context of the present invention.

Preferred Embodiment

The detailed description of the invention has described a datagram implementation of the invention as the best way to explain the invention. The preferred embodiment of the invention is as follows.

In the preferred embodiment, the wide area network is the Internet and the TLP protocol is TCP/IP. The GMS is a general purpose computer system connected to the Internet and the hosts are personal computers connected to the Internet.

TCP/IP provides an number of advantages that provide for a more efficient applications interface on the hosts 151. TCP/IP supports the concept of source and destination port numbers in its header. The ULP can make use of the port numbers to identify source and destination ULP connections. Most ULP send messages will be from hosts to a implicit ULP group addresses and most ULP receive messages will be from the implicit ULP addresses to the ULP host addresses. All of these and the ULP message type field can represented by source and destination port addresses within the TCP/IP header. This means that for most ULP messages, the ULP message encapsulated within the TCP/IP message need only contain the payload. There is the slight complication of the aggregated ULP receive messages sent from a ULP server process to a hosts. Here the destination port will be the host the source port will be for the implicit LJLP group address and the payload will still contain the source host ULP addresses in each the payload items.

TCP/IP also supports header compression for low speed dial-up lines which is also important in this application. See RFC 1144. TCP/IP is a connection oriented protocol which provides reliable end-to-end transport. It handles re-transmission on errors and fragmentation and reassembly of data transparently to upper level protocols. Header compression allows much of the TCP/IP header to be omitted with each packet to be replaced by a small connection identifier. This connection ID will uniquely define a connection consisting of a source and destination IP address and source and destination TCP/IP port numbers.

At the interface to the application on the hosts, the preferred embodiment of the ULP is as a session layer protocol. In the preferred embodiment the application on a host opens a session with a ULP server process. This session is identified with a unique session ID on the host. The host application then sends data to the ULP host interface 151 tagged with this session ID. The session ID defines a host and implicit ULP pair including the TCP/IP TLP address of the GMS server that is running the particular ULP server process for the implicit ULP address. By binding the transport address of the GMS of a ULP server process to the session ID, we can transparently to the application support multiple group messaging servers on the network and a single host can have multiple active sessions with different physical group messaging servers. This avoids any address space collision problems that could arise from the fact that the ULP address space is unique to each GMS.

Alternate Embodiments

One possible extension to the invention is to extend the ULP to support a common synchronized time base on the GMS and the hosts that are connected to it. This would be most interesting in context of the SI message aggregation mode. The SI time base on the GMS could be replicated on all of the hosts and all of the hosts and the GMS could lock these time bases together. There are known methods to synchronize time bases on multiple computer systems. One such method is called NTP.

Another extension to the invention is to define ULP server processes that perform specific application specific processing on the contents of the messages that are received. A variety of different application specific processing functions can be defined and implemented. A particular function would be selected by attributes provided in the create implicit group function. These functions could process the data in the message payloads and replace the data elements in the payloads with processed results. Separately, or in combination with processing the message payloads, the processing could store either raw message payload data in the application specific state storage area or could store processed results.

Clearly, the host system need not be personal computers, but could also be dedicated game consoles or television set top boxes or any other device with a programmable controller capable of implementing the ULP protocol. The wide area network used to transport the ULP protocol need not be the Internet or based on IP. Other networks with some means for wide area packet or datagram transport are possible including ATM networks or a digital cable television network.

The invention now being fully described, it will be apparent to one of ordinary skill in the art that any changes and modifications can be made thereto without departing from the spirit or scope of the invention as set forth herein. Accordingly, the present invention is to be limited solely by the scope of the appended claims.

What is claimed is:

1. A method for providing group messages to a plurality of host computers connected over a unicast wide area communication network, comprising the steps of:

providing a group messaging server coupled to said network, said server communicating with said plurality of host computers using said unicast network and maintaining a list of message groups, each message group containing at least one host computer;

sending, by a plurality of host computers belonging to a first message group, messages to said server via said unicast network, said messages containing a payload portion and a portion for identifying said first message group;

aggregating, by said server in a time interval determined in accordance with a predefined criterion, said payload portions of said messages to create an aggregated payload;

forming an aggregated message using said aggregated payload; and transmitting, by said server via said unicast network, said aggregated message to a recipient host computer belonging to said first message group.

2. The method of claim 1 wherein said time interval is a fixed period of time.

3. The method of claim 1 wherein said time interval corresponds to a time for said server to receive at least one message from each host computer belonging to said first message group.

4. The method of claim 1 further comprising the step of creating, by one of said plurality of host computers, said first message group by sending a first control message to said server via said unicast network.

5. The method of claim 4 further comprising the step of joining, by some of said plurality of host computers, said first message group by sending control messages via said unicast network to said server specifying said first message group.

6. The method of claim 1 wherein said network is Internet and said server communicates with said plurality of host computers using a session layer protocol.

* * * * *

(12) EX PARTE REEXAMINATION CERTIFICATE (8495th)
United States Patent
Rothschild et al.

(10) Number: US 5,822,523 C1
(45) Certificate Issued: Aug. 30, 2011

(54) SERVER-GROUP MESSAGING SYSTEM FOR INTERACTIVE APPLICATIONS

(75) Inventors: Jeffrey J. Rothschild, Los Gatos, CA (US); Marc P. Kwiatkowski, Los Gatos, CA (US); Daniel J. Samuel, Sunnyvale, CA (US)

(73) Assignee: PalTalk Holdings, Inc., New York, NY (US)

Reexamination Request:
No. 90/011,033, Jun. 14, 2010

Reexamination Certificate for:
Patent No.: 5,822,523
Issued: Oct. 13, 1998
Appl. No.: 08/595,323
Filed: Feb. 1, 1996

(51) Int. Cl.
*G06F 15/16* (2006.01)

(52) U.S. Cl. .................. 709/236; 709/206; 709/230
(58) Field of Classification Search .................. 395/200, 395/170
See application file for complete search history.

(56) References Cited

U.S. PATENT DOCUMENTS

| | | | |
|---|---|---|---|
| 4,479,195 A | 10/1984 | Herr et al. |
| 4,558,180 A | 12/1985 | Scordo |
| 4,572,509 A | 2/1986 | Sitrick |
| 4,740,954 A | 4/1988 | Cotton et al. |
| 4,807,224 A | 2/1989 | Naron et al. |
| 4,984,235 A | 1/1991 | Hillis et al. |
| 4,991,171 A | 2/1991 | Teraslinna et al. |
| 4,998,199 A | 3/1991 | Tashiro et al. |
| 5,079,767 A | 1/1992 | Perlman |
| 5,083,800 A | 1/1992 | Lockton |

(Continued)

FOREIGN PATENT DOCUMENTS

| EP | 0 384 876 B1 | 8/1990 |
|---|---|---|
| EP | 0598969 A1 | 6/1994 |

(Continued)

OTHER PUBLICATIONS

Ahuja, S.R., et al., "The Rapport Multimedia Conferencing System," Conference on Office Information Systems 1988, pp. 1–7.

(Continued)

*Primary Examiner* — Andrew L Nalven

(57) ABSTRACT

A method for deploying interactive applications over a network containing host computers and group messaging servers is disclosed. The method operates in a conventional unicast network architecture comprised of conventional network links and unicast gateways and routers. The hosts send messages containing destination group addresses by unicast to the group messaging servers. The group addresses select message groups maintained by the group messaging servers. For each message group, the group message servers also maintain a list of all the hosts that are members of the particular group. In its most simple implementation, the method consists of the group server receiving a message from a host containing a destination group address. Using the group address, the group messaging server then selects a message group which lists all of the host members of the group which are the targets of messages to the group. The group messaging server then forwards the message to each of the target hosts. In an interactive application, many messages will be arriving at the group server close to one another in time. Rather than simply forward each message to its targeted hosts, the group messaging server aggregates the contents of each of messages received during a specified time period and then sends an aggregated message to the targeted hosts. The time period can be defined in a number of ways. This method reduces the message traffic between hosts in a networked interactive application and contributes to reducing the latency in the communications between the hosts.

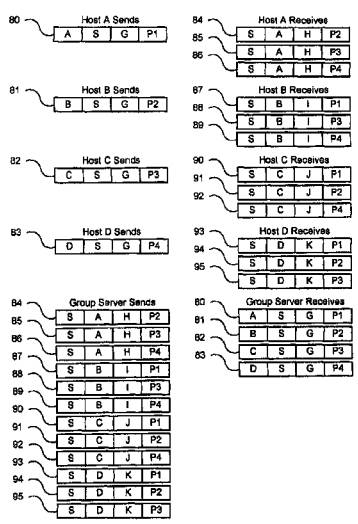

U.S. PATENT DOCUMENTS

| | | | |
|---|---|---|---|
| 5,089,813 A | 2/1992 | DeLuca et al. | |
| 5,117,420 A | 5/1992 | Hillis et al. | |
| 5,150,410 A | 9/1992 | Bertrand | |
| 5,150,464 A | 9/1992 | Sidhu et al. | |
| 5,245,608 A | 9/1993 | Deaton, Jr. et al. | |
| 5,247,615 A | 9/1993 | Mori et al. | |
| 5,257,113 A | 10/1993 | Chen et al. | |
| 5,260,942 A | 11/1993 | Auerbach et al. | |
| 5,287,530 A | 2/1994 | Davis et al. | |
| 5,289,460 A | 2/1994 | Drake, Jr. et al. | |
| 5,297,143 A | 3/1994 | Fridrich et al. | |
| 5,309,433 A | 5/1994 | Cidon et al. | |
| 5,309,437 A | 5/1994 | Perlman et al. | |
| 5,329,619 A | 7/1994 | Page et al. | |
| 5,361,256 A | 11/1994 | Doeringer et al. | |
| 5,365,523 A | 11/1994 | Derby et al. | |
| 5,408,261 A | 4/1995 | Kamata et al. | |
| 5,418,912 A | 5/1995 | Christenson | |
| 5,430,727 A | 7/1995 | Callon | |
| 5,436,896 A | 7/1995 | Anderson et al. | |
| 5,453,780 A | 9/1995 | Chen et al. | |
| 5,466,200 A | 11/1995 | Ulrich et al. | |
| 5,475,819 A | 12/1995 | Miller et al. | |
| 5,481,735 A | 1/1996 | Mortensen et al. | |
| 5,502,726 A | 3/1996 | Fischer | |
| 5,517,494 A | 5/1996 | Green | |
| 5,530,699 A | 6/1996 | Kline | |
| 5,539,741 A | 7/1996 | Barraclough et al. | |
| 5,558,339 A | 9/1996 | Perlman | |
| 5,581,552 A | 12/1996 | Civanlar et al. | |
| 5,586,257 A | 12/1996 | Perlman | |
| 5,586,937 A | 12/1996 | Menashe | |
| 5,590,281 A | 12/1996 | Stevens | |
| 5,594,732 A | 1/1997 | Bell et al. | |
| 5,598,535 A | 1/1997 | Brech et al. | |
| 5,608,726 A | 3/1997 | Virgile | |
| 5,630,757 A | 5/1997 | Gagin et al. | |
| 5,634,011 A | 5/1997 | Auerbach et al. | |
| 5,649,103 A | 7/1997 | Datta et al. | |
| 5,659,691 A | 8/1997 | Durward et al. | |
| 5,674,127 A | 10/1997 | Horstmann et al. | |
| 5,684,800 A | 11/1997 | Dobbins et al. | |
| 5,685,775 A | 11/1997 | Bakoglu et al. | |
| 5,690,582 A | 11/1997 | Ulrich et al. | |
| 5,729,540 A | 3/1998 | Wegrzyn | |
| 5,736,982 A | 4/1998 | Suzuki et al. | |
| 5,740,170 A | 4/1998 | Andou et al. | |
| 5,740,231 A | 4/1998 | Cohn et al. | |
| 5,761,436 A | 6/1998 | Nielsen | |
| 5,778,187 A | 7/1998 | Monteiro et al. | |
| 5,784,568 A | 7/1998 | Needham | |
| 5,785,630 A | 7/1998 | Bobick et al. | |
| 5,787,085 A | 7/1998 | Fox | |
| 5,805,823 A | 9/1998 | Seitz | |
| 5,805,830 A | 9/1998 | Reese et al. | |
| 5,812,552 A | 9/1998 | Arora et al. | |
| 5,829,041 A | 10/1998 | Okamoto et al. | |
| 5,841,980 A | 11/1998 | Waters et al. | |
| 5,890,995 A | 4/1999 | Bobick et al. | |
| 5,930,259 A | 7/1999 | Katsube et al. | |
| 5,946,308 A | 8/1999 | Dobbins et al. | |
| 5,956,485 A | 9/1999 | Perlman | |
| 6,041,166 A | 3/2000 | Hart et al. | |
| 6,076,117 A | 6/2000 | Billings | |
| 6,115,747 A | 9/2000 | Billings et al. | |
| 6,269,404 B1 | 7/2001 | Hart et al. | |
| 6,304,550 B1 | 10/2001 | Fox | |
| 6,426,954 B1 | 7/2002 | Krause | |
| 6,873,627 B1 | 3/2005 | Miller et al. | |
| 7,493,558 B2 | 2/2009 | Leahy et al. | |

FOREIGN PATENT DOCUMENTS

| | | |
|---|---|---|
| EP | 0 637 149 | 2/1995 |
| EP | 0687088 A2 | 12/1995 |
| EP | 0714684 A1 | 6/1996 |
| JP | 2-2262 | 1/1990 |
| JP | 2-192344 | 7/1990 |
| JP | 4-249938 | 9/1992 |
| JP | 5-199257 | 8/1993 |
| JP | 5-219096 | 8/1993 |
| JP | 5-336155 | 12/1993 |
| JP | 6-30041 | 2/1994 |
| JP | 6-152601 | 5/1994 |
| JP | 7-254900 | 10/1995 |
| WO | WO 93/15572 | 8/1993 |
| WO | WO 94/24803 | 10/1994 |
| WO | WO 95/10908 | 4/1995 |
| WO | WO 95/10911 | 4/1995 |
| WO | WO 97/04386 | 2/1997 |

OTHER PUBLICATIONS

Armstrong, S. et al., "Multicast Transport Protocol," Network Working Group Request For Comments: 1301, 1992, 31 pages.

Berglund, E.J. et al. "Amaze: A Distributed Multi–Player Game Program using the Distributed V Kernel," IEEE Proceedings of the Fourth Int'l Conf. on Distributed Systems, 1984, pp. 248–253.

Braden, R. (ed.), "Requirements for Internet Hosts—Communication Layers," Network Working Group Request for Comments: 1122, Oct. 1989, 100 pages.

Braden, R. (ed.), "Requirements for Internet Hosts—Application and Support," Network Working Group Request for Comments: 1123, Oct. 1989, 84 pages.

Braden, R. et al., "Integrated Services in the Internet Architecture: An Overview," Network Working Group Request for Comments: 1633, Jun. 1994, 27 pages.

Braudes, R. et al., "Requirements for Multicast Protocols," Network Working Group Request for Comments: 1458, May 1993, 16 pages.

Cameron, P. et al., "Transport Multiplexing Protocol (TMux)," Network Working Group Request for Comments: 1692, Aug. 1994, 10 pages.

Cheriton, D.R. et al., "Host Groups: A Multicast Extension for Datagram Internetworks," ACM/IEEE Proceedings of the Ninth Data Communications Symposium, Sep. 10–13, 1985, pp. 172–179.

Chimiak, W., "A Comment on Packet Video Remote Conferencing and the Transport/Network Layers," Network Working Group Request for Comments: 1453, Apr. 1993, 9 pages.

Crocker, D.H., "Standard For The Format Of ARPA Internet Text Messages," IETF RFC #822, Apr. 13, 1982, 43 pages.

Deering, S.E. et al., "Host Groups: A Multicast Extension to the Internet Protocol," Network Working Group Request for Comments: 966, Dec. 1985, 23 pages.

Deering, S., "Host Extensions for IP Multicasting," Network Working Group for Comments: 1054, May 1988, 16 pages.

Deering, S., "Host Extensions for IP Multicasting," Network Working Group Request for Comments: 1112, Aug. 1989, 14 pages.

Handley, M.J., "The Car System: Multimedia in Support of Collaborative Design," Computing and Control Division Colloquium on 'Multimedia and Professional Applications', Feb. 3, 1993, pp. 8/1–8/5.

Henckel, L., "Multipeer Transport Services for Multimedia Applications," High Performance Networking, V: Proc. Of the IFIP TC6/WG6.4 Fifth International Conference on High Performance Networking, Jun. 27–Jul. 1, 1994, pp. 167–184.

Kirsche, T. et al., "Communication support for cooperative work," Computer Communications, vol. 16, No. 9, Sep. 1993, pp. 594–602.

Lauwers, J.C. et al., "Replicated Architectures for Shared Window Systems: A Critique," Proc. of the ACM Conference on Office Information Systems, 1990, pp. 249–260.

Leung, Y–W. et al., "Optimum Connection Paths for a Class of Videoconferences," Int'l Conference on Comm. ICC 91, vol. 1 of 3, Jun. 23–26, 1991, pp. 0859–0865.

Leung, Y–W. et al., "A Modular Multirate Video Distributing System–Design and Dimensioning," IEEE/ACM Transactions on Networking, vol. 2, No. 6, Dec. 1994, pp. 549–557.

Li, Y. et al., "Multipoint Conferencing for Mobile Communications Network," 2.sup.nd Int'l. Conference on Universal Personal Communications, Oct. 12–15, 1993, pp. 212–216.

Multipoint Control Units For Audiovisual Systems Using Digital Channels Up To 2 Mbit/s, ITU Standard Draft H.231, 1993, pp. 11–22.

Ngoh, L., "Multicast Support for Group Communications," Computer Networks and ISDN Systems, 166–178, Oct. 1991, pp. 166–178.

Postel, J.B., "Simple Mail Transfer Protocol," Internet Engineering Task Force (IETF) Request for Comments (RFC) 821, Aug. 1982, 59 pages.

Rajagopalan, B., "Membership protocols for distributed conference control," Computer Communications, vol. 18, No. 10, Oct. 1995, pp. 695–708.

Ramanathan, S. et al., "Optimal Communication Architecture for Multimedia Conferencing in Distributed Systems," The 12.sup.th Int'l Conference on Distributed Computing Systems, Jun. 9–12, 1992, pp. 46–53.

Rose, M.T. et al., "Proposed Standard for Message Encapsulation," Network Working Group Request for Comments: 934, Jan. 1985, 9 pages.

Schaffer, U., "MPPS—A Multiparty Presentation Service," Upper Layer Protocols, Architectures and Applications: Proc. Of the IFIP TC6/WG6.5 International Conference on Upper Layer Protocols, Architectures and Applications, Jun. 1–3, 1994, pp. 243–256.

Schooler, E.M., "The Impact of Scaling on a Multimedia Connection Architecture," ACM Journal of Multimedia Systems, vol. 1, No. 1, 1993, pp. 1–10.

Schulzrinne, H., "RTP: A Transport Protocol for Real–Time Applications," IETF Internet Draft draft–ietf–avt–rtp–00.doc, Dec. 15, 1992, 23 pages.

Schulzrinne, H. et al., "RTP: A Transport Protocol for Real–Time Applications," IETF Internet Draft draft–ietf–avt–rtp–01.txt, 05–6, 1993, 16 pages.

Schulzrinne, H. et al., "RTP: A Transport Protocol for Real–Time Applications," IETF Internet Draft draft–ietf–avt–rtp–02.txt, Jun. 30, 1993, 24 pages.

Schulzrinne, H. et al., "RTP: A Transport Protocol for Real–Time Applications," IETF Internet Draft draft–ietf–avt–rtp–04.txt, Oct. 20, 1993, 33 pages.

Schulzrinne, H. et al., "RTP: A Transport Protocol for Real–Time Applications," Network Working Group Request for Comments Request for Comments: 1889, Jan. 1996, 61 pages.

Singhal, S.K. et al., "Using a Position History–Based Protocol for Distributed Object Visualization," Stanford University Technical Report No. CS–TR–94–1505, 1994, 25 pages.

"System for Establishing Communication Between Audiovisual Terminals Using Digital Channels Up To 2 Mbit/s," Amended/New Draft Recommendation Of The H.240–Series Submitted To The Xth CCITT Plenary Assembly COM XV–R 94–E, May 1992, 68 pages.

Thomas, E., "Listserv Distribute Protocol," Network Working Group Request for Comments: 1429, Feb. 1993, 7 pages.

Turletti, T., "H.261 software codec for videoconferencing over the Internet," Rapports de Recherche No. 1834, Jan. 1993, pp. 1–18.

Vin, H.M. et al., "Multimedia Conferencing in the Etherphone Environment," Computer: Multimedia Information Systems, Oct. 1991, pp. 69–79.

Vonderweidt, G. et al., "A Multipoint Communication Service for Interactive Applications," IEEE Transactions on Communications, vol. 39, No. 12, Dec. 1991, pp. 1875–1885.

Waitzman, D. et al., "Distance Vector Multicast Routing Protocol," Network Working Group Request for Comments: 1075, Nov. 1988, 20 pages.

Wancho, F., Digest Message Format: Network Working Group Request for Comments: 1153, Apr. 1990, 4 pages.

Waters, A.G., "Multicast Provision for High Speed Networks," High Performance Networking, IV: Proc. Of the IFIP TC6/WG6.4 Fourth International Conference on High Performance Networking, Dec. 14–18, 1992, pp. 317–332.

Weiss, G. et al., "Packet Switched Voice Conferencing Across Interconnected Networks," Proceedings 13.sup.th Conference on Local Computer Networks, Oct. 10–12, 1988, pp. 114–124.

Weiss, G. et al., "A Comparative Analysis of Implementation Mechanism for Packet Voice Conferencing," IEEE INFOCOM '90 Proceedings vol. 1., 1990, pp. 1062–1070.

Willebeek–Lemair, M.H. et al., "Centralized versus Distributed Schemes for Videoconferencing," Proceedings of the Fifth IEEE Computer Society Workshop on Future Trends of Distributed Computing Systems, Aug. 28–30, 1995, pp. 85–93.

Zarros, P.N.,et al., "Statistical Synchronization Among Participants in Real–Time Multimedia Conference," IEEE InfoCom Proceedings '94 vol. 1, 1994, p. 912–919.

Ziegler, C. et al., "Implementation Mechanisms for Packet Switched Voice Conferencing," IEEE Journal on Selected Areas in Communications, vol. 7, No. 5, Jun. 1989, pp. 698–706.

Altenhofen, Michael et al., "The Berkom Multimedia Collaboration Service,"ACM Multimedia, 1993, pp. 457–462.

Arango, Mauricio et al., "Touring Machine: A Software Infrastructure to Support Multimedia Communications," Communications of the ACM, 1993, pp. 186–189.

Chang, Wan–the et al., "Call Processing And Signaling in A Desktop Multimedia Conferencing System," Proc. Of Globecom, 1992, pp. 225–229.

Deering, Stephen Edward, Multicast Routing In A Datagram Internetwork, Stanford University Dissertation, Dec. 1991, pp. i–xiii and 1–137.

Horton, Mark R., "UUCP Mail Interchange Format Standard," Networking Working Group Request for Comments: 976, Feb. 1986, 10 pages.

Kantor, Brian et al., "Network News Transfer Protocol: A Proposed Standard for the Stream–Based Transmission of News," Networking Working Group Request for Comments: 977, Feb. 1986, 22 pages.

Leiner, B. (ed.), "Critical Issues in High Bandwidth Networking," Networking Working Group Request for Comments: 1077, Nov. 1988, 37 pages.

Nagle, John, "Congestion Control in IP/TCP Internetworks," Networking Group Request for Comments: 896, Jan. 6, 1984, 8 pages.

Ong, Lyndon Y. and Schwartz, Mischa, "Centralized and Distributed Control for Multimedia Conferencing," Proceedings of ICC, 1993, pp. 197–201.

Romahn, Gotz, "System Aspects Of Multipoint Videoconferencing," Glovecom, 1987, pp. 723–725.

Schulzrinne et al., "RTP: A Transport Protocol for Real–Time Applications," IETF Internet Draft draft–ietf–avt–rtp–06.txt, Nov. 28, 1994, 93 pages.

Schulzrinne et al., "RTP: A Transport Protocol for Real–Time Applications," IETF Internet Draft draft–ietf–avt–rtp–new–08.txt, Jul. 14, 2000, 90 pages.

Zellweger, Polle T. et al., "An Overview Of The Etherphone System And Its Applications," 2nd IEEE Conference on Computer Workstations, Mar. 7–10, 1988, pp. 160–168.

Defendants' Initial Disclosure of Prior Art Under Civil Local Rule 16–7(D)–(E), 21 Pages, Entered Apr. 4, 2000 in *HearMe v. Lipstream Networks, Inc. et al.*, United States District Court for the Northern District of California, Case No. C 99–04506 WHA.

Defendants' Response Chart For U.S. application No. 5,822, 523 Under Civil Local Rule 16–9(B), 26 Pages Plus Exhibits A–K, Dated Jul. 5, 2000, Filed in *HearMe v. Lipstream Networks, Inc. et al.*, United States District Court for the Northern District of California—San Francisco Division, Case No. C 99–04506 WHA.

Defendants' Response Chart For U.S. application No. 6,018, 766 Under Civil Local Rule 16–9(B), 28 Pages Plus Exhibits A–J, Dated Aug. 1, 2000, Filed in *HearMe v. Lipstream Networks, Inc. et al.*, United States District Court for the Northern District of California—San Francisco Division, Case No. C 99–04506 WHA.

Addeo, E.J. et al., "A Multi–Media Multi–Point Communication Services Capability for Broadband Networks," 1987, pp. 423–428.

Addeo, E.J. et al., "Personal Multi–Media Multi–Point Communication Services for Broadband Networks," 1988, pp. 53–57.

Aguilar, Lorenzo, "Datagram Routing for Internet Multicasting," 1984, pp. 58–63.

Aguilar, L. et al., "Architecture for a Multimedia Teleconferencing System," 1986, pp. 126–136.

Aras, C. et al., "Real–Time Communication in Packet–Switched Networks," 1994, pp. 122–139.

Baguette, Yves et al., "Comparison of TP4, TCP and XTP—Part 1: Connection Management Mechanisms (*)," vol. 3–N 5, Sep.–Oct. 1992, pp. 1–12.

Baker, Rusti et al., "Multimedia Processing Model for a Distributed Multimedia I/O System*," Network and Operating System Support for Digital Audio and Video, 1992, pp. 164–175.

Bettati, R. et al., "Connection Establishment for Multi–Party Real–Time Communication," Network and Operating Systems Support for Digital Audio and Video, 1995, pp. 240–250.

Bharath–Kumar, Kadaba and et al., "Routing to Multiple Destinations in Computer Networks," 1993, pp. 343–351.

Birchler, Barbara D. et al., "Toward a general Theory of Unicast–Based Multicast Communication*," pp. 237–251.

Birman, K.P. et al., "On Communication Support for Fault Tolerant Process Groups," Network Working Group Request for Comments: 992, Nov. 1986, pp. 1–16.

Braden, Robert et al., "The Design of the RSVP Protocol," RSVP Project: Final Report, 05–27, Jun. 30, 1993, 1995, pp. 1–21.

Brown, E.F. et al., "A Continuous Presence Video Conferencing System," 1978, pp. 34.1.1–34.1.4.

Brown, T. et al., "Packet Video for Heterogeneous Networks Using CU–SEEME," Proceedings ICIP–96, Sep. 16–19, 1996, pp. 9–12.

Bubenik et al., "Multipoint Connection Management in High Speed Networks," 1991, pp. 59–68.

Casner, Stephen et al., "N–Way Conferencing with Packet Video," The Third International Workshop on Packet Video, Mar. 22–23, 1990, pp. 1–6.

Chia, L.T. et al., "An Experimental Integrated Workstation for Teleconferencing," Integrating Telecommunications and Information Technology on the Desktop, Mar. 1994, pp. 1–5.

Clark, David D. et al., "Supporting Real–Time Applications in an Integrated Services Packet Network: Architecture and Mechanism," 1992, pp. 14–26.

Clark, William J., "Multipoint Multimedia Conferencing," IEEE Communications Magazine, May 1992, pp. 44–50.

Cohen, David M. et al., "Performance Modeling of Video Teleconferencing in ATM Networks," IEEE Transactions on Circuits and Systems for Video Technology, vol. 3, No. 6, Dec. 1993, pp. 408–420.

Crowcroft, J. et al., "Multimedia TeleConferencing over International Packet Switched Networks. RN/90/XX," IEEE Conference on Communications Software: Communications for Distributed Applications & Systems, Apr. 18–19, 1991, pp. 23–33.

Deering, Stephen et al., "An Architecture for Wide–Area Multicast Routing," 1994, pp. 126–135.

Deering, Stephen E., "Multicast Routing in Internetworks and Extended LANs," SIGCOMM '88 Symposium Communications Architectures & Protocols, Aug. 16–19, 1988, pp. 55–64.

Deering, Stephen E, et al., "Multicast Routing in Datagram Internetworks and Extended LANs," ACM Transactions on Computers Systems, May 1990, vol. 8, No. 2, pp. 85–110.

Dewan, Prasun et al., "A High–Level and Flexible Framework for Implementing Multiuser User Interfaces," ACM Transactions on Information Systems, Oct. 1992, vol. 10, No. 4, pp. 345–380.

Draoli, M. et al., "Video Conferencing on a LAN/MAN Interconnected System: QoS Evaluation," Proceedings of the Fourth International Conference on Computer Communications and Networks, Sep. 20–23, 1995, pp. 170–177.

Draoli, M. et al., "Videoconferencing on a LAN/MAN Architecture: Service Evaluation and System Dimensioning," Communications Technology Proceedings, 1996, vol. 2, pp. 630–633.

Ensor, J. Robert et al., "The Rapport Multimedia Conferencing System—A Software Overview," 2.sup.nd IEEE Conference on Computer Workstations, Mar. 7–10, 1988, pp. 52–58.

Ferrari, Domenico et al., "Network support for multimedia A discussion of the Tenet Approach," Computer Networks and ISDN Systems, 1994, pp. 1267–1280.

Fliesser, R.J. et al., "Design of a Multicast ATM Packet Switch," 1993 Canadian Conference on Electrical and Computer Engineering, vol. 1, pp. 779–783.

Han, Jefferson et al., "CU–SeeMe VR Immersive Desktop Teleconferencing," ACM Multimedia, 1996, 9 pages.

Harju, Jarmo et al., "Quality and Performance of a Desktop Video Conferencing System in the Network of Interconnected LANs," Proceedings of the 19th Conference on Local Networks, 1994, pp. 365–371.

Heinrichs, Bernd et al., "OSI Communication Services Supporting CSCW Applications," SIGDOC '93, 1993, pp. 107–115.

Herzog, Shai et al., "Sharing 'Cost' of Multicast Trees: An Axiomatic Analysis," ACM SIGCOMM '95 Conference, Aug. 1995, pp. 1–15.

Hopper, Andy, "Pandora—an experimental system for multimedia applications," Operating Systems Review, Apr. 1990, vol. 24, No. 2, pp. 19–34.

Huang, Jau–Hsiung et al., "Design and Implementation of Multimedia Conference System on Broadcast Networks*," 18th Conference on Local Computer Networks, 1993, pp. 337–341.

Jia, Weija, "Implementation of a Reliable Multicast Protocol," Software—Practices & Experiences, Jul. 1997, pp. 813–849.

Koerner, Eckhart, "Group Management for a Multimedia Collaboration Service," Presented at EUNICE '96 Summer School on Telecommunications Services, Sep. 23–27, 1996, pp. 1–11.

Kohlert, Doug et al., "Implementing a Graphical Multi–user Interface Toolkit," Software—Practice and Experience, Sep. 1993, vol. 23, No. 9, pp. 981–999.

Larsen, A.B. et al., "'Continuous Presence' Video Conferencing at 1.5–6Mb/sec," pp. 391–398.

Lauwers, J. Chris et al., "Collaboration Awareness in Support of Collaboration Transparency: Requirements for the Next of Shared Window Systems," CHI '90 Proceedings, Apr. 1990, pp. 303–311.

Leung, Wu–hon F. et al., "A Software Architecture for Workstations Supporting Multimedia Conferencing in Packet Switching Networks," IEEE Journal on Selected Areas in Communications, Apr. 1990, vol. 8, No. 1, pp. 380–390.

Li, L. et al., "Real–time Synchronization Control in Multimedia Distributed Systems" pp. 294–305.

Li, S. et al., "VC collaborator: a mechanism for video conferencing support*," Proceedings of SPIE, Oct. 1995, pp. 89–99.

Mathy, L. et al., "The ACCOPI Multimedia Transport Service over ATM," Proceedings of 2ndCOST237 Workshop on Teleservices and Multimedia Communication, Nov. 20–22, 1995, pp. 159–175.

Mathy, L. et al., "A Group Communication Framework," Broadband Islands '94: Connecting with the End–user, 1994, pp. 167–178.

Mathy, L. et al., "Towards an Integrated Solution for Multimedia Communications," Rev. AIM, 1996, pp. 3–10.

Mathy, L. and Bonaventure, O., "QoS Negotiation for Multicast Communications," Multimedia Transport and Teleservices Lecture Notes in Computer Science, 1994, pp. 199–218.

McCanne, S. et al., "Joint Source/Channel Coding for Multicast Packet Video," Proceedings of the International Conference on Image Processing, Oct. 23–26, 1995, pp. 25–28.

Mitzel, Danny J. et al., "An Architecture Comparison of ST–II and RSVP," 10 pages.

Mitzel, Danny J. et al., "Asymptotic Resource Consumption in Multicast Reservation Styles," ACM SIGCOMM '94 Conference, Aug. 1994, pp. 1–8.

Moy, J., "Multicast Extensions to OSPF," Network Working Group Request for Comments: 1584, Mar. 1994, 83 pages.

Nguyen, Mai–Huong et al., "MCMP: A Transport/Session Level Distributed Protocol for Desktop Conference Setup," Sep. 1996, vol. 14, No. 7, pp. 1404–1421.

Nichols, Kathleen M., "Network Performance of Packet Video on a Local Area Network," IPCCC '92, Apr. 1–3, 1992, pp. 0659–0666.

Nicolaou, Cosmos, "An Architecture for Real–Time Multimedia Communications Systems," IEEE Journal on Selected Area Communications, Apr. 1990, vol. 8, No. 1, pp. 391–400.

Parsa, M. et al., "Scalable Internet Multicast Routing," 4th International Conference on Computer Communications and Networks, Sep. 20–23, 1995, pp. 162–166.

Partridge, C., "A Proposed Flow Specification," Network Working Group Request for Comments: 1363, Sep. 1992, 17 pages.

Pasquale, Joseph C. et al., "The Multimedia Multicast Channel," Internetworking Research and Experience, 1994, vol. 5, pp. 151–162.

Pasquale, Joseph C. et al., "The multimedia multicasting problem," Multimedia Systems, 1998, pp. 43–59.

Rangan, P. Venkat, "Communication Architectures and Algorithms for Media Mixing in Multimedia Conferences," IEEE/ACM Transactions on Networking, 1993, pp. 20–30.

Reibman, Amy R. et al., "Traffic Descriptors for VBR Video Teleconferencing Over ATM Networks," IEEE/ACM Transactions on Networking, Jun. 1995, vol. 3, No. 3, pp. 329–339.

Robinson, John et al., "A Multimedia Interactive Conferencing Application for Personal Workstations," IEEE Transactions on Communications, Nov. 1991, pp. 1698–1708.

Robinson, John A., "Communications services architecture for CSCW," Computer Communications, May 1994, vol. 17, No. 5, pp. 339–347.

Sabri, Shaker et al., "Video Conferencing Systems," Proceedings of the IEEE, Apr. 1985, vol. 73, No. 4, pp. 671–688.

Sakata, Shiro, "Multimedia and Multi–party Desktop Conference System (MERMAID) as Groupware Platform," IEEE Region 10's Ninth Annual International Conference Proceedings, Aug. 1994, pp. 739–743.

Sasse, M.–A, et al., "Workstation–based multimedia conferencing: Experiences from the MICE project," Integrating Telecommunication and Information Technology on the Desktop, 1994, pp. 1–6.

Schmandt, Chris et al., "An Adio and Telephone Server for Multi–media Workstations," 2nd IEEE Conference on Computer Workstations, Mar. 7–10, 1988, pp. 150–159.

Schooler, Eve M. et al., Stephen L., "An Architecture for Multimedia Connection Management," Reprinted from the Proceedings IEEE 4th Comsoc International Workshop on Multimedia Communications, Apr. 1992, pp. 271–274.

Schooler, Eve M., "Case Study: Multimedia Conference Control in a Packet–Switched Teleconferencing System," Reprinted from the Journal of Internetworking: Research and Experience, Jun. 1993, vol. 4, No. 2, pp. 99–120.

Schooler, Eve M., An Distributed Architecture for Multimedia Conference Control, ISI Research Report No. ISI/RR–91–289, Nov. 1991, pp. 1–18.

Schooler, Eve M. et al., "Multimedia Conferencing: Has it come of age?" Reprinted from the Proceedings 24th Hawaii International Conference on Systems Sciences, Jan. 1991, vol. 3, pp. 707–716.

Soman, Sadhna et al., "An Experimental study of Video Conferencing over the Internet," IEEE Globecom '94, 1994, pp. 720–724.

Strigini, Lorenso et al., "Multicast Services on High–Speed Interconnected LANs," High Speed Local Area Networks, 1987, pp. 173–176.

Tanigawa, Hiroya et al., Personal Multimedia–Multipoint Teleconference System, 1991, pp. 1127–1134.

Tassiulas, Leandros et al., "Dynamic Server Allocation to Parallel Queues with Randomly Varying Connectivity," IEEE Transactions on Information Theory, Mar. 1993, vol. 39, No. 2, pp. 466–478.

Tillman, Matthew A. et al., "SNA and OSI: Three Strategies for Interconnection," Communications of the ACM, Feb. 1990, vol. 33, No. 2, pp. 214–224.

Turletti, Thierry et al., "Videoconferencing on the Internet," IEEE/ACM Transactions on Networking, 1996, pp. 340–351.

Topolcic, C. (ed.), "Experimental Internet Stream Protocol, version 2 (ST–11)," Network Working Group Request for Comments: 1190, Oct. 1990, 127 pages.

Venkatesh, D. et al., "Investigation of Web Server Access as a Basis for Designing Video–on–Demand Systems," Proceedings of the International Society for Optical Engineering, Oct. 23–24, 1995, vol. 2617, pp. 2–11.

Watabe, K. et al., "A Distributed Multiparty Desktop Conferencing System and its Architecture," 1990, pp. 386–393.

What Is RTP? (visited Jan. 4, 2000) <http://raddist.rad.com/networks/1996/iphone/rtp.htm>, 5 pages.

Wilde, Erik et al., "Transport–Independent Group and Session Management for Group Communications Platforms," ETT, Jul.–Aug. 1997, vol. 8, No. 4, pp. 409–421.

Woodside, Murray C. et al., "Alternative Software Architectures for Parallel Protocol Execution with Synchronous IPC," IEEE/ACM Transactions on Networking, Apr. 1993, vol. 1, No. 2, pp. 178–186.

Xylomenos, George et al., "IP Multicast for Mobile Hosts," IEEE Communications Magazine, Jan. 1997, pp. 54–58.

Xylomenos, George et al., "IP Multicast group management for point–to–point local distribution," Computer Communications, 1998, pp. 1645–1654.

Yeung, K.H. et al., "Selective Broadcast Data Distribution Systems," Proceedings of the 15th International Conference on Distributed Computing Systems 05–30–Jun. 2, 1995, pp. 317–324.

Yum, Tak–Shing et al., "Video Bandwidth Allocation for Multimedia Teleconferences," IEEE Transactions on Communications, Feb./Mar./Apr. 1995, vol. 43, Nos. 2/3/4, pp. 457–465.

Zarros, Panagiotis N. et al., "Interparticipant Synchronization in Real–Time Multimedia Conferencing Using Feedback," IEEE/ACM Transactions on Networking, Apr. 1996, vol. 4, No. 4, pp. 173–180.

Zarros, Panagiotis N. et al., "Statistical Synchronization Among Participants in Real–Time Multimedia Conference," Proceedings of the IEEE Symposium on Computers and Communications, Jun. 27–29, 1995, pp. 30–36.

Zhang, Lixia et al., "RSVP: A New Resource ReserVation Protocol," Accepted By IEEE Network Magazine, (date unknown), 22 pages.

Oikarinen, J. et al., "Internet Relay Chat Protocol," Networking Group Request for Comments: 1459, May 1993, <http://www.tuug.org/.sup..about. f/irc/text/rfc1459.txt>, 57 pages.

Macedonia, Michael R. et al., "A Taxonomy for Networked Virtual Environments", Immersive Telepresence, pp. 48–56.

Funkhouser, Thomas A. "Ring: A Client–Server System for Multi–User Virtual Environments", 1995 Symposium on Interactive 3D Graphics, pp. 85–209, Monterey, CA.

Van Hook, Daniel J. et al., "An Approach to DIS Scaleability", 11th DIS Workshop, pp. 1–9, Sep. 26–30, 1994.

Oikarinen, J. et al., "Internet Relay Chat Protocol", Network Working Group, May 1993, pp. 1–61.

IEEE Standard for Information Technology—Protocols for Distributed Interactive Simulation Applications, IEEE, Nov. 10, 2009, pp. 1–64.

Abdel–Wahab, Hussein, "Reliable Information Service for Internet Computer Conferencing", IEEE, 1993, pp. 128–142.

Amir, Yair, "Replication Using Group Communication Over a Partitioned Network", Thesis, 1995, pp. 1–95.

Bangay, Shaun, "Parallel Implementation of a Virtual Reality System on a Transputer Architecture", Jul. 1993, pp. 1–128.

Brutzman, Donald P., "A Virtual World for an Autonomous Underwater Vehicle", Dissertation, Dec. 1994, pp. 1–293.

Brutzman, Donald P. et al., "Internetwork Infrastructure Requirements for Virtual Environements", Naval Postgraduate School, pp. 1–11.

Calvin, James O. et al., "Stow Realtime Information Transfer and Networking System Architecture", Twelfth Workshop on Standards for the Interoperability of Distributed Simulations, Mar. 13–17, 1995, pp. 1–11.

Cheriton, David R. et al., "Distributed Process Groups in the V Kernel", ACM Transactions on Computer Systems, vol. 3, No. 2, May 1985, pp. 77–107.

Curtis, Pavel et al., "MUDs Grow Up: Social Virtual Reality in the Real World", Xerox PARC, Jan. 19, 1993, pp. 1–6.

Sanders, Robert M. et al., The Xpress Transfer Protocol (XTP) A Tutorial (Expanded Version), NASA Johnson Space Center, Engineering directorate, Flight Data Systems Division, University of Houston—Clear Lake, Jan. 1990, pp. 1–78.

Duvvur, Prasanth, "Managing Data on the World Wide Web "State of the Art Survey of Innovative Tools and Techniques, Massachusetts Institute of Technology, Sep. 1995, pp. 1–102.

Ellis, Clarence A. "A Model and Algorithm for Concurrent Access Within Groupware", University of Colorado at Boulder, Department of Computer Science, Apr. 1992, pp. 0–34.

Evard, Remy, "Collaborative Networked Communication: MUDs as Systems Tools", Northeastern University, Monterey, California, Nov. 1–5, 1993, pp. 1–8.

Friedman, Roy et al., "Packing Message as a Tool for Boosting the Performance of Total Ordering Protocols", Cornell University, Jul. 7, 1995, pp. 0–17.

Gajewska, Hania et al., "Argo: A System for Distributed Collaboration", Digital Equipment Corporation, pp. 1–8.

Gaudet, Stuart S., "Dynamic Project Collaboration and Control Using the World Wide Web", Massachusetts Institute of Technology, Oct. 1995, pp. 1–225.

Golding, Richard Andrew, "Weak–consistency group communication and membership", Dissertation, Dec. 1992, pp. 1–165.

Greenhalgh, Chris et al., "Massive: a Distributed Virtual Reality System Incorporating Spatial Trading", IEEE, 1995, pp. 27–34.

Hofmann, Markus, "A Generic Concept for Large–Scale Multicast", Proceedings of International Zurich Seminar on Digital Communications, Zurich, Switzerland, Springer Verlag, Feb. 1996, pp. 1–12.

Jabi, Wassim M. et al., "Beyond the Shared Whiteboard: Issues in Computer Supported Collaborative Design", Proceedings of CAAD Future '95: The Sixth International Conference on Computer–Aided Architectural Design Futures, Sep. 24–26, 1995, Singapore, pp. 1–9.

Kaashoek, M.F., "Group Communication in Distributed Computer Systems", Vrije Universiteit, Amsterdam, The Netherlands, 1992, pp. 1–220.

Kaashoek, M. Frans, "Efficient Reliable Group Communication for Distributed Systems", Vrije Universiteit, Amsterdam, The Netherlands, 1992, pp. 1–51.

Macedonia, Michael R., "A Network Software Architecture for Large Scale Virtual Environments", Dissertation, Jun. 1995, pp. 1–200.

Macedonia, Michael R. et al., "Exploiting Reality with Multicast Groups: A Network Architecture for Large–Scale Virtual Environments", Naval Postgraduate School, IEEE, 1995, pp. 2–10.

Miller, Duncan C. Miller, Sc.D., "Network Performance Requirements for Real–Time Distributed Simulation", Proc. INET, 1994, pp. 241–1–241–8.

Pullen, J. Mark, "Networking for Distributed Virtual Simulation", Proc. INET, 1994, pp. 243.1–243.7.

Sdingh, Gurminder, "BrickNet: A Software Toolkit for Network–Based Virtual Worlds", The Massachusetts Institute of Technology, Presence, vol. 3, No. 1, Winter 1994, pp. 19–35.

Srinivas, Kankanahalli et al., "MONET: A Multi–media System for Conferencing and Application Sharing in Distributed Systems", CERC Technical Report Series, Research Note, Concurrent Engineering Research Center, West Virginia University, Feb. 1992, pp. 1–19.

Kaashoek, M. Frans et al., "Group communication in Amoeba and its applications", The British Computer Society, The Instituting of Electrical Engineers and IOP Publishing Ltd., 1993, pp. 48–58.

Van Renesse, Robert et al., "Design and Performance of Horus: A Lightweight Group Communications System", Department of Computer Science, Cornell University, pp. 1–18.

Van Renesse, Robert et al., "Reliable Multicast Between Microkernels", Computer Science Department, Cornell University, USENIX Association, Apr. 27–28, 1992, pp. 267–283.

Feiner, Steven et al., "A Virtual World for Network Management", 1993 IEEE, Oct. 18–22, 1993, Seattle, WA, pp. 55–61.

Crabtree, R.P., "Job networking", IBM Systems J, vol. 17, No. 3, 1978, pp. 206–220.

Nagle, John, "Congestion Control in IP/TCP Internetworks", Computer Communication Review, ACM SIGCOMM, pp. 1–9.

Nagle, John, "Congestion Control in IP/TCP Internetworks", Network Working Group, Request for Comments: 896, Jan. 6, 1984, pp. 1–9.

Bartle, Dr. Richard, "Interactive Multi–User Computer Games", British Telecom plc., Dec. 1990, pp. 1–152.

Eppinger, Jeffrey L. et al., "Camelot and Avalon, A Distributed Transaction Facility", pp. 1–43.

Gettys, Jin et al., "Volum One: Xlib Programming Manual for Version 11 of the X Window System", O'Reilly & Associates, Inc., 1992, pp. 1–513.

Bacon, David F. et al., "Compiler Transformations for High–Performance Computing", Computer Science Division, University of California, Berkeley, CA, pp. 1–79.

Kazman, Rick, "Making Waves: On the Design of Architectures for Low–end Distributed Virtual Environments", Department of Computer Science, University of Waterloo, 1993 IEEE, pp. 442–449.

Shaw, Chris et al., "The MR Toolkit Peers Package and Experiment", Department of Computing Science, University of Alberta, Jul. 14, 1994, IEEE, pp. 1–8.

Tiernan, T.R., "Synthetic Theater of War—Europe (STOW–E) Final Report", Naval Command, Control and Ocean Surveillance Center, Technical Report 1700, Jan. 1995, San Diego, CA, pp. 1–77.

Hiranandani, Seema et al., "Evaluating Compiler Optimizations for Fortran D", Research Report, pp. 1–40.

André, Francoise et al., "The Pandore Compiler: Overview and Experimental Results", IRISA, Publication No. 869, Oct. 1994, pp. 1–26.

Banerjee, Prithviraj et al., "The Paradigm Compiler for Distributed–Memory Message Passing Multicomputers", First International Workshop on Parallel Processing, Bangalore, India, Dec. 1994, pp. 1–9.

Wang, Qunjie et al., "EM—An Environment Manager for Building Networked Virtual Environments", 1995 IEEE, pp. 11–18.

Singh, Gurminder et al., "BrickNet: Sharing Object Behaviors on the Net", Institute of Systems Science, 1995 IEEE, pp. 19–25.

Broll, Wolfgang, "Interacting in Distributed Collaborative Virtual Environments", Institute for Applied Information Technology, German National Research Center for Computer Science (GMD), 1995 IEEE, pp. 148–155.

Maxfield, John et al., "A Distributed Virtual Environment for Concurrent Engineering", The Keyworth Institute of Manufacturing and Information Systems Engineering, Virtual Working Environments Laboratory, School of Computer Studies, The University of Leeds, United Kingdom, 1955 IEEE, pp. 162–170.

Zyda, Michael J., "Networked Virtual Environments", Computer Science Department, Naval Postgraduate School, 1995 IEEE, pp. 230–231.

Wen, Chih–Po, "Portable Library Support for Irregular Applications", Dissertation, University of California at Berkeley, 1995, pp. 1–134.

Yelick, Katherine et al., "Parallel Data Structure for Symbolic Computation", University of Barkeley, Computer Science Division, Parallel Symbolic Languages and Systems, Oct. 1995, pp. 1–17.

Wen, Chih–Po et al., "Portable Runtime Support for Asynchronous Simulation", Computer Science Division, University of California, Internation Conference on Parallel Processing, 1995, pp. 1–10.

Itsuki, Noda, "Soccer Server: a simulator of RoboCup", pp. 1–6.

Wang, Qunjie, "Networked Virtual Reality", Thesis, University of Alberta, pp. 1–108.

Macedonia, Michael R. et al., "NPSNET: A Multi–Player 3D Virtual Environment over the Internet", 1995 Symposium on Interactive 3D Graphics, Monterey, CA, pp. 93, 94 and 210.

Vin, Harrick M. et al., "Hierarchical Conferencing Architectures for Inter–Group Multimedia Collaboration", Multimedia Laboratory, Department of Computer Science and Engineering, University of California at San Diego, pp. 43–54, 1991 ACM.

Keune, C. M. et al., "Synthetic Theater of War–Europe (STOW–E) Technical Analysis", Technical Report 1703, Aug. 1995, pp. 1–75.

Rangan, P. Venkat et al., "Communication Architectures and Algorithms for Media Mixing in Multimedia Conferences", IEEE/ACM Transactions on Networking, vol. 1., No. 1, Feb. 1993, pp. 20–30.

Gong, Fengmin, "Multipoint Audio and Video Control for Packet–Based Multimedia Conference", MCNC Information Technologies, 1994 ACM, pp. 425–432.

Kostrivas, John, "Design and Implementation of a Membership Server and Its Application Interface", Thesis, U.S. Navy, Naval Postgraduate School, Monterey, CA, Mar. 10, 1995, pp. 1–74.

Shaw, V. et al., "A Distributed Multimedia System for Application and Communications", School of Applied Science, Nanyang Technological University, Singapore, 1995 IEEE, pp. 221–229.

Herdman, Roger C., "Distributed Interactive Simulation of Combat", U.S. Government Printing Office, Sep. 1995, pp. 1–83.

Ziegler, Chaim et al., "Multimedia Conferencing on Local Area Networks", Brooklyn College, 1990 IEEE, pp. 52–61.

Singh, Gurminder et al., "Networked Virtual Worlds", Institute of Science Science, National University of Singapore, 1995 IEEE, pp. 44–49.

Choudhary, Alok N. et al., "Proceedings of the 1993 International Conference on Parallel Processing", The Pennsylvania State University, vol. 11 Software, Aug. 16–20, 1993, CRC Press, Inc., pp. 1–33.

Maloni, Kelly et al., Net games, Your Guide to the Games People Play on the Electronic Highway, Random House, pp. 1–6.

Shah, Rawn et al., "Playing Wargames on the Internet", Complete guide to Empire, Galactic, and Netrek, pp. 1–30.

Abdel–Wahab, H.M., "Multiuser tools architecture for group collaboration in computer networks", Department of Computer Science, Old Dominion University, VA, vol. 13, No. 3 Apr. 1990, pp. 165–169.

Waters, Gill et al., "Three–party talk facility on a computer network", Department of Electronic Systems Engineering, University of Essex, UK, vol. 10, No. 3, Jun. 1987, pp. 115–120.

Hodel, Horst, "Multicast–Routing—Grundlage des Multimedia–Conferencing im Internet", Bulletin SEV/VSE, 17/96, pp. 17–22, 3 and 65.

Blanchard, Chuck et al., "What's Net in Reality Built for Two", Proceedings of the ACM Snowbird Conference, Feb. 1990, pp. 1–6.

McFadden, Andy, "UDP client, the wave of the future", E–mail, htty://www.cs.cmu.edu/afs/cs.cmu.edu/.../udp, Mar. 8, 1992, pp. 1–18.

Flinn, Kelton et al., "Super VGA Air Warrior", Flight Manual, pp. 1–147.

Snoswell, Michael, Overview of Cyberterm, a Cyberspace Protocol Implementation, pp. 1–12.

Benedikt, Michael, Cyberspace: First Steps, MIT Press, London, England, pp. 1–35.

Bennett, J. et al., "Munin: Distributed Shared Memory Based on Type–Specific Memory Coherence", Proceedings of 2nd ACM SIGPLAN Symposium on PPoPP, 1990, pp. 168–176.

Carter, J. et al., "Implementation and Performance of Munin", Proceedings of 13th Symposium on Operating System Principles, 1991, pp. 152–164.

Coleman, S. et al., "The TCP/IP Internet DOOM FAQ", http://www.gamers.org/dhs/helpdocs/inetdoom.html, Aug. 1998, pp. 1–10.

Cotton, J. et al., "The TCP/IP Internet Gamer's FAQ", http://x8.dejanews.com/getdoc.xp?AN–1031, Jul. 1998, pp. 1–9.

Coulouris, G. et al., "Distributed Systems: Concepts and Design", Addison–Wesley Publishing Co., 1994, pp. 333–348.

Funkhouser, T., "Ring: A Client–Server System for Multi–User Virtual Environments", pp. 1–9.

James, R. et al., "Creating Your Own Multiplayer Game Systems", Dr. Dobb's Information Highway Sourcebook, Winter, 1994, pp. 56–64.

Macedonia, M., et al., "MBone Provides Audio and Video Across the Internet", IEEE Computer, vol. 27, Issue 4, 30–36, Apr. 1994, pp. 1–12.

Macedonia, M., et al., "NPSNET: A Network Software Architecture for Large Scale Virtual Environments", Presence, vol. 3, No. 4, Fall, 1994, pp. 1–30.

Schulzrinne, H. et al., "A Transport Protocol for Real–Time Applications", IFET Internet Draft draft–ifet–avt–rtp–05.txt, 1994, pp. 1–16.

Wolfe, D., "The BBS Construction Kit", 1st Ed., 1994, John Wiley & Sons, Inc., New York, pp. 1–37.

Server2.5pl4.tar.gz ("Server Code") and BRMH–1.7.tar.gz ("Client Code") (source code dated no later than Aug. 19941) ("Netrek").

J. Oikarinen et al. RFC 1459, "Internet Relay Chat Protocol", published May 1993 ("IRC RFC").

R. Friedman et al. "Packing Messages as a Tool for Boosting the Performance of Total Ordering Protocols", Dept. of Science of Cornell University, published Jul. 7, 1995 ("Friedman").

Daniel J. Van Hook, James O. Calvin, Michael K. Newton, and David A. Fusco, "An Approach to DIS Scaleability," 11th DIS Workshop, Sep. 26–30, 1994 ("Van Hook").

IEEE 1278–1993 "IEEE Standard for Information Technology—Protocols for Distributed Interactive Simulation Applications", approved Mar. 18, 1993, and published in 1993 ("DIS").

T. A. Funkhouser, "Ring: A Client–Server System for Multi–User Virtual Environments," Association of Computing Machinery, 1995 Symposium on Interactive 3D Graphics, Monterey CA, Apr. 9–12, 19952 ("Ring").

Andy McFadden, "The History of Netrek", published Jan. 1, 1994 ("McFadden").

Michael R. Macedonia, "Exploiting Reality with Multicast Groups", published Sep. 1995 ("Macedonia").

Memorandum Opinion and Order, Dated Apr. 5, 2011, filed in *Paltalk Holdings, Inc.* v. *Sony Computer Entertainment America, Inc., et al.,* United States District Court for the Eastern District of Texas–Marshall Division, Case No. 2:09–CV–274–DF–CE.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7-47 are added and determined to be patentable.

7. *The method of claim 1, wherein said time interval is between 33 ms and 200 ms.*

8. *The method of claim 1, wherein said aggregating is performed 5 to 30 times a second.*

9. *The method of claim 1, wherein said server implements a group messaging protocol layered on top of a transport protocol of said unicast network, wherein said group messaging protocol uses an address space that is seperate from an address space of said transport protocol.*

10. *The method of claim 11, wherein said messaging protocol is performed at a session layer.*

11. *The method of claim 1, further comprising the step of performing, by said server, echo suppression.*

12. *The method of claim 1, wherein said plurality of host computers belonging to said first message group correspond to players that are in close proximity to one another within a three-dimentional space of a computer game.*

13. *The method of claim 1, further comprising the step of changing membership of said first message group based on activities of players within a computer game.*

14. *The method of claim 1, further comprising the step of changing membership of said first message group based on changes in player position within a three-dimentional space of a computer game.*

15. *The method of claim 1, wherein membership of said first message group changes dynamically over time.*

16. *The method of claim 1, wherein membership of said first message group changes over time based on control messages received from ones of said plurality of host computers.*

17. *The method of claim 1, wherein membership of said first message group changes over time based on indications received from ones of said plurality of host computers to join or leave said first message group.*

18. *The method of claim 1, wherein said messages comprise application specific state information.*

19. *The method of claim 1, wherein said unicast network is a wide area network.*

20. *The method of claim 19, wherein said group messaging server facilitates host computer-to-host computer communication.*

21. *The method of claim 19, wherein said group messaging server facilitates host computer-to-host computer communication usable by said plurality of host computers to maintain a consistent operating state.*

22. *The method of claim 19, wherein said group messaging server facilitates transmission of messages between ones of said plurality of host computers, wherein said transmitted messages are usable by said plurality of host computers to maintiain a consistent operating state of an application.*

23. *The method of claim 22, wherein said application is a game.*

24. *The method of claim 19, wherein each message of said messages comprises information that other host computers in said first message group use to maintain a consistent application state.*

25. *The method of claim 19, wherein said messages are generated for transmission to host computers in said first message group.*

26. *The method of claim 19, wherein said messages are sent between said plurality of host computers in said first message group via said group messaging server.*

27. *The method of claim 1, wherein said aggregated message corresponds to a networked computer game, and wherein said first message group is only for players on a specified team within said game.*

28. *The method of claim 1, wherein said aggregated message corresponds to a networked computer game, and wherein said aggregated message is only for players on a specified team that are within a certain area of said game.*

29. *The method of claim 1, wherein said server is configured to receive a further message specifying said first message group and a second message group, and wherein said server is configured to transmit said further message to those of said plurality of host computers belonging to both said first and second message groups.*

30. *The method of claim 1, wherein said server is configured to receive a further message specifying a set of message groups and operations to be performed on said specified set of message groups to determine host computers to which said further message is to be delivered.*

31. *The method of claim 1, wherein said sending and said transmitting is implemented using a protocol that encapsulates message information within a datagram of a transport protocol of said unicast network.*

32. *The method of claim 1, wherein said sending and said transmitting are performed by an upper-level protocol implemented above a transport layer protocol of said unicast network, wherein said transport layer protocol is TCP/IP.*

33. *The method of claim 1, wherein said sending and said transmitting are performed by an upper-protocol implemented above a transport layer protocol of said unicast network, wherein said plurality of host computers are unable to send upper-level protocol messages to one another except through said group messaging server.*

34. *The method of claim 1, further comprising the steps of:*
   *said server receiving, from one of said plurality of host computers, a control message to create said first message group; and*
   *creating said first message group in response to receiving said control message.*

35. *The method of claim 1, further comprising the steps of:*
   *said server receiving, from a first host computer of said plurality of host computers, a control message to join said first message group; and*
   *adding said first host computer to said first message group in response to receiving said request.*

36. *The method of claim 1, further comprising the steps of:*
   *said server receiving, from a first host computer of said plurality of host computers, a control message to leave said first message group; and*
   *removing said first host computer from said first message group in response to receiving said request.*

37. The method of claim 1, further comprising the steps of:

said server receiving a control message to close said first message group; and removing said first message group in response to receiving said request.

38. The method of claim 1, further comprising the steps of:

said server receiving, from a first host computer of said plurality of host computers, a control message to query message groups of said server; and providing said list of message groups to said first host computer in response to said receiving said control message.

39. The method of claim 1, further comprising the steps of:

said server receiving, from a first computer of said plurality of host computers, a control message to query members of said first message group; and providing a list of members of said first message group to said first host computer in response to receiving said control message.

40. The method of claim 1, further comprising the steps of:

said server receiving, from a first host computer of said plurality of host computers, a control message to query attributes of said first message group; and providing attributes of said first message group to said first host computer in response to receiving control message.

41. The method of claim 1, further comprising the steps of:

said server receiving, from a first host computer of said plurality of host computers, a control message to connect to said group messaging server; and storing information regarding said first host computer in response to receiving said control message.

42. The method of claim 1, further comprising the steps of:

said server receiving, from a first host computer of said plurality of host computers, a control message to disconnect from said group messaging server; and removing information regarding said first host computer in response to receiving said control message.

43. The method of claim 1, wherein said aggregated message comprises compressing said aggregated payload.

44. The method of claim 1, wherein said time period is dynamically varied according to the predefined criterion.

45. The method of claim 44, wherein said predefined criterion is based on message rates received by said server.

46. The method of claim 44, wherein said predefined criterion is based on data rates received by said server.

47. The method of claim 1, further comprising of:

processing said payload portions according to an application specific processing function to replace data elements in said payload portions with processed results.

* * * * *